US006386931B1

(12) United States Patent
Nanami

(10) Patent No.: US 6,386,931 B1
(45) Date of Patent: May 14, 2002

(54) ENGINE MOUNT FOR WATERCRAFT

(75) Inventor: Masayoshi Nanami, Iwata (JP)

(73) Assignee: Yamaha Hatsudoki Kabushiki Kaisha, Shizuoka-ken (JP)

(*) Notice: Subject to any disclaimer, the term of this patent is extended or adjusted under 35 U.S.C. 154(b) by 0 days.

(21) Appl. No.: 09/517,972

(22) Filed: Mar. 3, 2000

(30) Foreign Application Priority Data

Mar. 30, 1999 (JP) .............................. 11-56134

(51) Int. Cl.$^7$ .............................................. B63H 21/30
(52) U.S. Cl. ........................ 440/111; 440/38; 440/88; 440/89; 114/55.5
(58) Field of Search .................. 440/111, 89, 38, 440/83, 88; 248/637, 659; 267/140.11, 140.13, 292; 114/55.5

(56) References Cited

U.S. PATENT DOCUMENTS

| 4,003,330 A | * 1/1977 | Compton ..................... 440/111 |
| 4,621,595 A | 11/1986 | Suzuki ...................... 123/41.72 |
| 4,942,838 A | 7/1990 | Boyer et al. ................. 114/345 |
| 5,211,592 A | * 5/1993 | Alkema ....................... 440/111 |
| 5,399,111 A | 3/1995 | Kobayashi et al. ............. 440/6 |
| 5,460,555 A | * 10/1995 | Fukuoka et al. .............. 440/88 |
| 5,511,505 A | 4/1996 | Kobayashi et al. ............ 440/89 |
| 5,531,620 A | * 7/1996 | Ozawa et al. ................ 440/89 |
| 5,558,549 A | * 9/1996 | Nakase ....................... 440/88 |
| 5,562,509 A | * 10/1996 | Nakase et al. ............... 440/89 |
| 5,582,125 A | * 12/1996 | Matsumoto ................. 114/55.5 |
| 5,584,733 A | * 12/1996 | Kobayashi ................... 440/38 |
| 5,586,922 A | * 12/1996 | Kobayashi et al. ............ 440/88 |
| 5,634,422 A | * 6/1997 | Kobayashi et al. ......... 114/55.5 |
| 5,695,371 A | * 12/1997 | Katoh ........................ 440/111 |
| 5,702,276 A | * 12/1997 | Nakase et al. ................ 440/89 |
| 5,788,547 A | * 8/1998 | Ozawa et al. ................. 440/89 |
| 5,797,778 A | 8/1998 | Ito et al. .................... 440/111 |
| 5,845,596 A | 12/1998 | Imaeda et al. ............... 114/363 |
| 5,857,423 A | * 1/1999 | Imaeda et al. ................ 440/38 |

OTHER PUBLICATIONS

Mercury 200 Optimax M2 Jet Drive.

* cited by examiner

Primary Examiner—S. Joseph Morano
Assistant Examiner—Lars A. Olson
(74) Attorney, Agent, or Firm—Knobbe, Martens, Olson & Bear, LLP

(57) ABSTRACT

A watercraft includes an internal combustion engine mounted such that its crankshaft extends vertically. A gearbox is arranged beneath the engine and includes engine mounts attached directly thereto for mounting the engine to a mounting surface within the engine compartment. Thus, the engine may be mounted compactly arranged in the rear of the watercraft, thus minimizing the overall length of the engine compartment. Additionally, the engine mounts allow the engine to be mounted conveniently within a watercraft in a vertical orientation. The gear box may also include at least a portion of an exhaust conduit extending therethrough. The gear box may be also utilized as a lubricant reservoir for a lubrication system of the engine. Additionally, the exhaust conduit passing through the gear box may include a cooling jacket, thus protecting oil in the gear box from the heat emitted from the exhaust conduit therein.

55 Claims, 14 Drawing Sheets

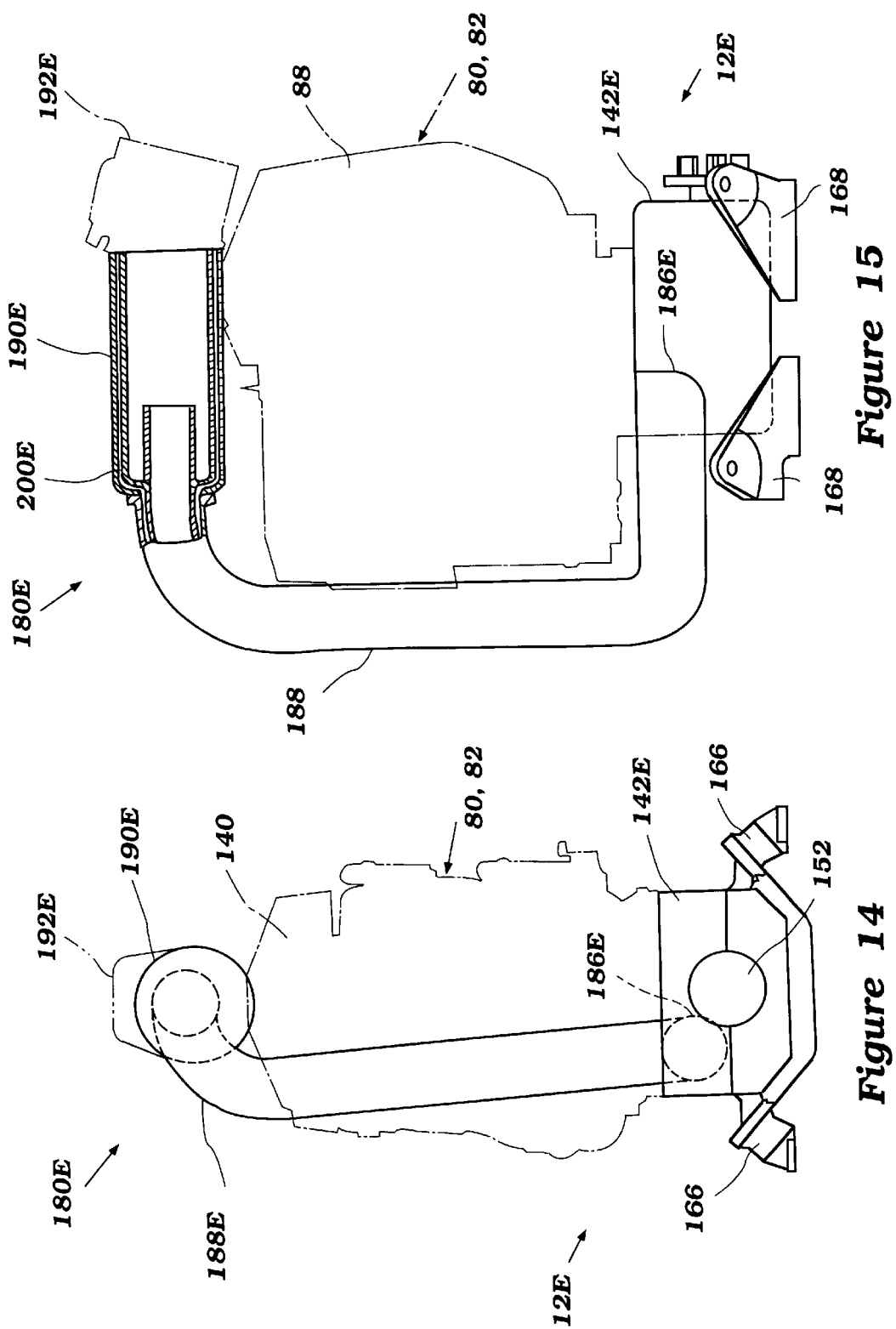

ENGINE MOUNT FOR WATERCRAFT

The present application is based on and claims priority to Japanese Patent Application No. 11-56134, filed March 3, 1999.

BACKGROUND OF THE INVENTION

1. Field of the Invention

The present invention is directed to an engine mount for a watercraft, and more particularly, to an engine mount for a watercraft having an engine that is vertically oriented.

2. Description of Related Art

The design of watercraft, and particularly the engine compartment and the passengers' area thereof, presents considerable challenges to the designer, particularly in the class of watercraft that is designed primarily to accommodate a relatively few number of people (for example, eight or less passengers). The watercraft should be designed so as to provide comfortable seating for each passenger. In addition, each passenger should be seated in a position which allows the passenger to enjoy the view without obstructions from the others. The watercraft should also include storage compartments for carrying paraphernalia used by boaters, such as coolers, beverages, food, water skiing equipment, and other such items.

One type of watercraft which is becoming relatively popular is the so-called "open bow" or "bow rider" type of watercraft. This type of watercraft typically includes a main passengers' compartment positioned at approximately midship in which the operator's control position is located. The bow of the watercraft is provided with a further passengers'area. Alternatively, the bow of the watercraft may include a small cabin which may have a seat and/or a head.

For convenient and efficient hull configuration, however, the bow area generally tapers inwardly toward the tip or nose of the bow. Thus, the foot area for passengers seated in the bow area can be restricted. With this type of watercraft, it is also desirable to permit access between the two passengers' areas without the rider having to climb over a portion of the hull which separates the two areas. Passthroughs can be provided between the main and bow passengers' areas, but these passthroughs then restrict the available seating area in the bow portion, as well as its effectiveness.

The rear or "aft" of an inboard/outboard engine-powered the watercraft typically includes an engine compartment positioned behind the passengers' areas. The engine compartment may or may not extend over the entire width of the watercraft.

Of course, accommodating each of the above areas, compartments, and considerations can be met by merely making the size of the watercraft larger. However, as the size of the watercraft is increased, the weight is also increased. In particular, the overall length of a watercraft is a critical dimension which affects the overall weight of the watercraft. As the weight of the watercraft increases, so does the power required to drive it, as well as the cost of the watercraft itself and the difficulty in transporting the watercraft from one location to another.

SUMMARY OF THE INVENTION

A need therefore exists for a watercraft which minimizes the overall length of the engine compartment, thus allowing the overall length and size of the watercraft to be minimized. It is desirable that the engine compartment configuration does not comprise the comfort of the passengers' areas.

According to one aspect of the present invention, a watercraft includes at least one passengers' area and an engine compartment positioned rearward from the passengers' area and including at least one internal combustion engine. The internal combustion engine is arranged such that its crankshaft is vertically oriented. The gear box which connects the crankshaft of the engine to a propulsion unit, is arranged at least partially beneath the engine. Arranged as such, the overall length, i.e., along a longitudinal axis of the hull of the watercraft, is minimized, since the gear box is located at least partially beneath the engine.

One aspect of the present invention includes the realization that the engine compartments of some watercraft can accommodate vertically oriented engines. For example, a hull of a small watercraft which includes a passengers' are with at least two seats in a side-by-side relationship in a passengers' area typically has a height which allows passengers to sit in the passengers' area and be protected by the side walls or bulwarks of the hull while in a seated position. Thus, the maximum overall height of an engine compartment arranged behind the passengers' area of a known watercraft may extend from a lower surface of the hull up to the upper edge of the bulwarks, without excessively increasing the overall height of the hull. Thus, by mounting an engine in an engine compartment such that the crankshaft of the engine extends vertically, the present invention allows the overall length of the engine compartment to be minimized. The reduction in the engine compartment length has a significant impact on the overall length of the watercraft and the size of the passengers' areas. Thus, by providing an engine mount as such, the overall weight and the resulting power-to-weight ratio of the watercraft is enhanced. Additionally, by minimizing the overall length of the engine compartment, additional space may be provided for storage compartments.

According to another aspect of the present invention, a watercraft includes an engine compartment and engine provided within the engine compartment. The engine includes an engine body having a crankshaft journaled for rotation at least partially within the engine body and about a generally vertical axis. A gear box having an output shaft driven by the crankshaft, is provided beneath the engine. The watercraft also includes lubrication system which includes a lubricant reservoir and which is configured to circulate lubricant between the lubricant reservoir and at least one lubricant gallery provided within the engine body. The gear box forms at least a portion of the lubricant reservoir.

By providing a gear box beneath the engine body which forms at least a portion of the lubricant reservoir, the watercraft according to the present invention efficiently utilizes the limited space available in engine compartments of watercaft. For example, as noted above, the size of the engine compartment affects the overall size, and thus the overall weight, of a watercraft. Therefore, by providing a gear box which provides the dual functions of journaling gears therein and providing a reservoir for the lubrication system, the watercraft according to the present invention reduces the overall size occupied by the engine and thus allows the overall size of the engine compartment as well as the watercraft itself, to be reduced.

According to a further aspect of the present invention, a watercraft includes a hull having an engine compartment and at least one internal combustion engine disposed within the engine compartment. The engine includes an engine body and a crankshaft journaled for rotation at least partially within the engine body. The engine body is oriented such that the crankshaft rotates about a generally vertical axis.

The gear box is arranged at a lower end of the engine body and includes an output shaft which is driven by the crankshaft of the engine. The watercraft also includes an exhaust system having at least a first exhaust conduit, a portion of which passes through at least a portion of the gear box.

By arranging at least a portion of the exhaust system to pass at least partially through the gear box, the present invention provides enhanced flexibility in the design of the exhaust system. For example, the engine body can include an exhaust collector passage extending through the engine body to an exhaust outlet port provided at an interface between the engine body in the gear box. In this arrangement, a portion of the exhaust system extends between the exhaust outlet port and a side wall of the gear box. The remainder of the exhaust system extends from the side wall of the gear box to various down stream exhaust system components. Configured as such, the remainder of the exhaust system may be arranged in various arrangements which maximize the limited space available in the engine compartment of watercraft. For example, since the exhaust conduit passes through the gear box at a lower end of the engine, the remainder of the exhaust system may be routed deep within the engine compartment, thereby providing enhanced access to the other components attached to the engine body. Alternatively, the remainder of the exhaust system may be routed upward and over the top of the engine, thereby allowing the remainder of the exhaust system to be extended so as to enhance sound attenuation, while not excessively increasing a width of the engine.

Further aspects, features, and advantages of the present invention will become apparent from the detailed description of the preferred embodiment that follows.

BRIEF DESCRIPTION OF THE DRAWINGS

The above-mentioned and other features of the invention will now be described with reference to the drawings of the preferred embodiment of the present watercraft. The illustrated embodiment of the watercraft is intended to illustrate, but not to limit, the invention. The drawings contain the following figures:

FIG. 14 is a rear elevational view of the engine shown in FIG. 13;

FIG. 15 is a side elevational view of the engine shown in FIG. 13;

DETAILED DESCRIPTION OF THE PREFERRED EMBODIMENTS OF THE INVENTION

An improved gear box for a watercraft is disclosed herein. The gear box allows for enhanced flexibility in arranging the engine in an engine compartment of a watercraft, which thereby aids in minimizing the overall dimensions of the engine compartment, and thus the overall dimensions and weight of the watercraft. Thus, a watercraft incorporating the present gear box can have an engine compartment with a minimized length, thus minimizing the corresponding overall length and weight of the watercraft.

Figure 1:
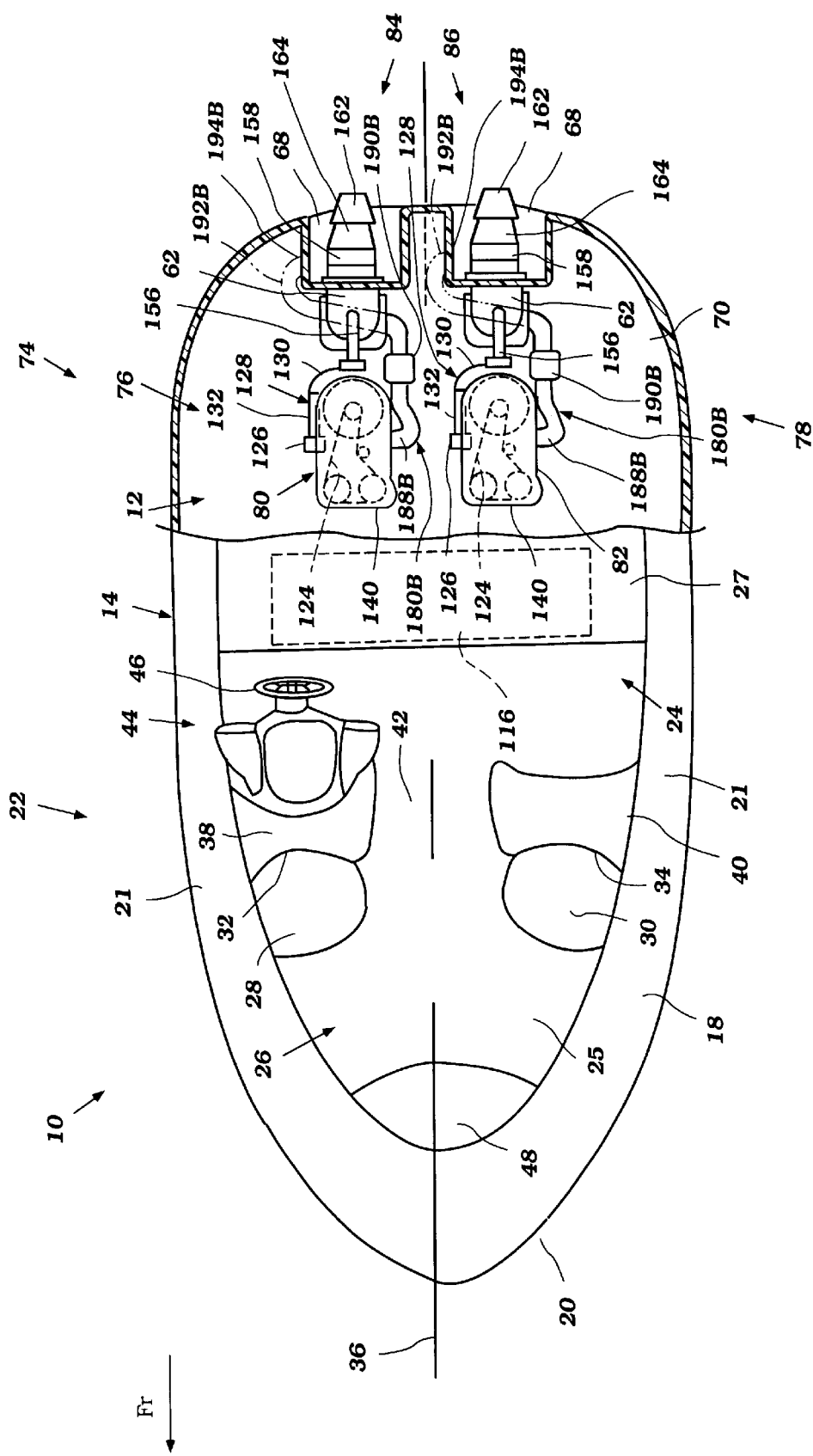
FIG. 1 is a top plan view of a watercraft, having a passengers' area and an engine compartment shown in section.

The following describes the illustrated watercraft 10 in reference to a coordinate system in order ease the description of the watercraft 10. A longitudinal axis extends from bow to stem and a lateral axis from the port side to the starboard side normal to the longitudinal axis. In addition, relative heights are expressed as elevations in reference to the under surface of the watercraft. In FIG. 1, a label FR is used to note the direction in which the watercraft travels during normal forward operation.

Figure 2:
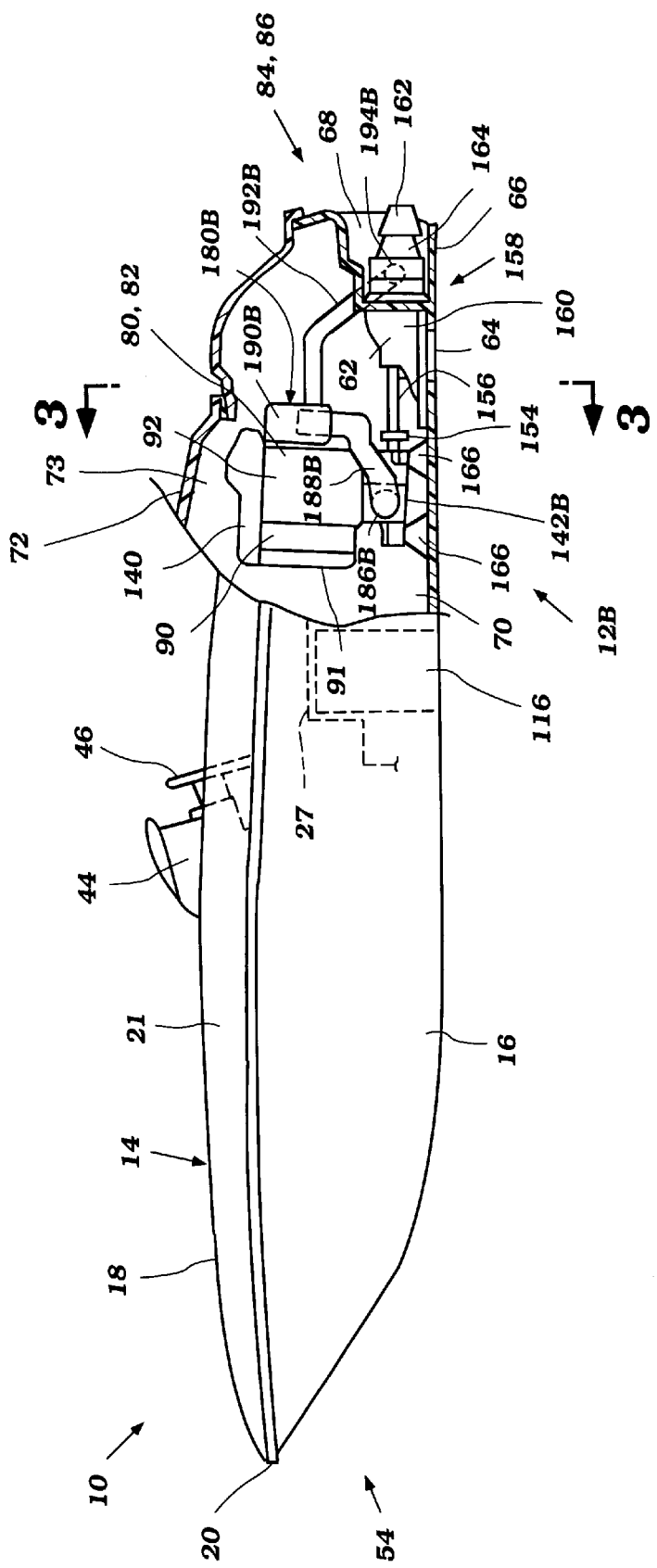
FIG. 2 is a side elevational view of the watercraft illustrated in FIG. 1, with a partial sectional view of the engine compartment and including a gear box assembly configured in accordance with one embodiment of the present invention.
Figure 3:
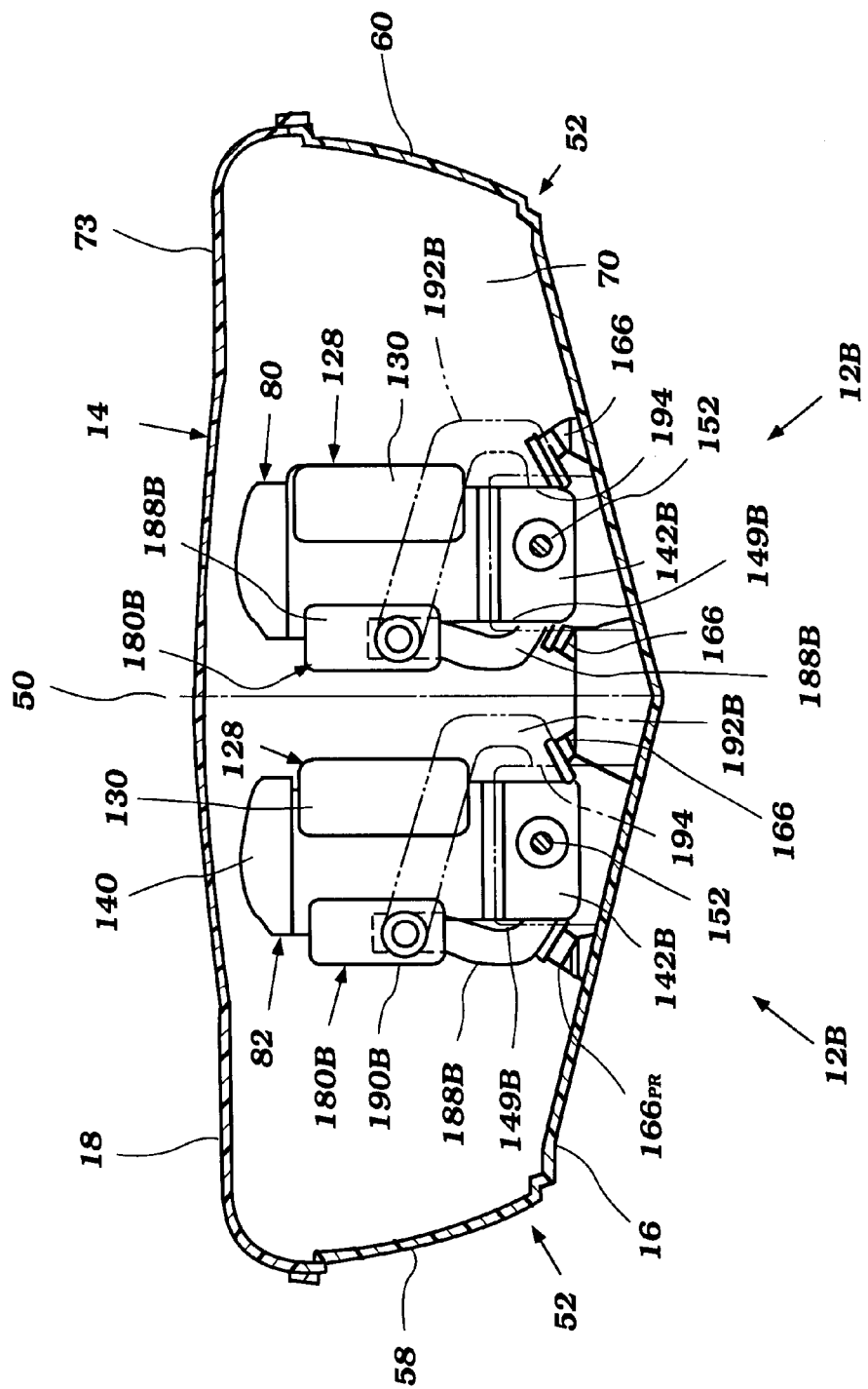
FIG. 3 is a sectional view of the engine compartment shown in FIG. 2, taken along line 3-3.

FIGS. 1-3 illustrate a small watercraft 10 having an engine including a gear box assembly 12 configured in accordance with a preferred embodiment of the present invention. Although the present gear box assembly 12 of the watercraft 10 is illustrated in connection with a small open bow watercraft, the illustrated gear box assembly 12 can be used for other types of watercraft as well, such as, for example, but without limitation, large open bow boats, sailboats, land vehicles, and the like. Before describing the gear box assembly 12, an exemplary watercraft 10 will be described in general details to assist the reader's understanding of the environment of use of the present gear box assembly 12.

The watercraft 10 is comprised primarily of a hull 14. The hull 14 is comprised of a lower portion 16 and a deck portion 18. The lower portion 16 and the deck portion 18 are both formed from a suitable material such as a molded fiberglass reinforced resin (e.g., SMC). The lower hull portion 16 and the upper deck portion 18 are fixed to each other around the peripheral edges 20 in any suitable manner.

As shown in FIGS. 1 and 2, the peripheral edge 20 is the outermost portion of the watercraft 10 and projects laterally outward from the hull 14. Preferably, the peripheral edge 20 includes a cushion (not shown) fixed to the peripheral edge 20. As such, the cushion absorbs minor impacts that may occur during docking, for example.

As shown in FIG. 1, a passengers' area 22 is formed primarily by the upper deck portion 18. The passengers' area 22 includes a main, centrally positioned passengers' area 24 in which a bench-type seat 27 is provided. The bench-type seat 27 can be comprised of a removable cushion portion which defines three bench-type seat parts, each of which is sized and adapted to accommodate a single adult passenger. A seat back assembly can be provided which cooperates with the seat cushions so as to provide a comfortable seat during operation of the watercraft 10.

The passengers' area 22 also includes a "forward," "bow rider's," or "open bow" portion 26, which has a generally triangular configuration in top plan view. The triangular shape of the open bow portion 26 generally matches the shape of the hull 14 in top plan view (FIG. 1).

The open bow portion 26 is provided with a pair of passenger seats 28, 30, each of which is sized to accommodate an adult passenger. The seats 28, 30 include respective back rests 32, 34. The seat portions 28, 30 are disposed so that riders seated thereon would generally face forwardly and towards a centerline 36 of the watercraft 10. Because of this angular relationship of the passenger seats 28, 30, the passengers may be seated comfortably and stretch their legs forwardly so as to have adequate leg room without interference.

The seat backs 32, 34 are formed by portions 38, 40 of the upper deck portion 18 which extend inwardly toward the hull centerline 36. The portions 38, 40 also define a passageway 42 through which a rider may pass between the open bow portion 26 and the main passengers' area 24. The width of the passageway 42 preferably is approximately equal to or smaller than the width of one of the seat portions of the bench-type seat 27, so as to provide adequate body strength, and maximum seating capacity for the riders in the seats 28, 30, while allowing free access between the open bow portion 26 and the main passengers' area 24.

The upper deck portion 18 also forms bulwarks 21 around a peripheral edge of the passengers' area 22. The bulwarks 21 aid in protecting passengers seated in the passengers' area 22. Additionally, the upper deck portion 18 forms a generally flat deck area 25 in the main passengers' area 24 and the open bow portion 26. Although not illustrated, the bulwarks 21 rise to an elevation roughly level with a shoulder of an adult user seated in the passengers' area 22.

As shown in FIG. 1, the right hand side of the main seating area 24 includes a control panel 44. The control panel 44 is formed at the rear of the right hand hull portion 38. Numerous instruments and controls may be mounted on the control panel 44, including for example, but without limitation, a steering wheel 46, for steering the watercraft.

At the front of the open bow portion 26, there is provided a raised pedestal 48 which has a storage compartment therein that can be utilized for a variety of purposes, such as a picnic cooler. The compartment may be configured so that it can be lifted out for use at a remote location. A cover plate (not shown) encloses the storage compartment within the pedestal 48. The cover plate may form a raised area on which the riders in the seats 28, 30 may place their feet. Alternatively, an additional passenger may sit on the cover plate. This central passenger can sit in a rearwardly-facing direction and extend their legs into the passageway 42, thus leaving free leg area for three adult passengers in the open bow portion 26.

The area beneath the passage 42 may also include an elongated storage compartment (not shown). A hatch cover is preferably provided over the storage area. Elongated objects, such as fishing poles, water skis, or the like, may be conveniently concealed beneath this area.

The lower hull section 16 is designed such that the watercraft 10 planes or rides on a minimum surface area at the aft end of the lower hull section 16 in order to optimize the speed and handling of the watercraft 10 when up on plane. For this purpose, as best seen in FIG. 3, the lower hull section 16 has a generally V-shaped configuration formed by a pair of inclined sections that extend outwardly from a keel line 50 to outer chines 52 at a dead rise angle. The inclined sections extend longitudinally from the bow 54 toward the transom 56 of the lower hull section 16 and extend outwardly to side walls 58, 60 of the lower hull section 16. The side walls 58, 60 are generally flat and straight near the stern of the lower hull section 16 and smoothly blend towards a longitudinal center of the watercraft at the bow 54. The lines of intersection between the inclined sections and the corresponding side walls 58, 60 form the outer chines 52 which affect handling, as known in the art.

With reference to FIG. 2, toward the transom 56 of the watercraft 10, the inclined sections of the lower hull section 16 extend outwardly from a recessed channel or tunnel 62 that extends upward toward the upper deck section 18. The tunnel 62 has a generally parallelepiped shape and opens through the transom 56 of the watercraft 10.

An inlet opening 64 opens into the hull tunnel 62. A ride plate 66 covers a portion of the tunnel 62 so as to provide a planing surface for the watercraft 10. A pump chamber 68 is thus defined within the tunnel 62 and covered by the ride plate 66.

In the illustrated embodiment, the hull tunnels 62 are formed from separate members which are affixed to the lower hull section 16. However, it is apparent to one of ordinary skill in the art that the hull tunnels 62 may be formed monolithically with the lower hull section 16.

As shown in FIGS. 1 and 2, the lower hull portion 16 and the upper deck portion 18 cooperate to define an engine compartment 70 at a position rearward from the passengers' area 22. In order to provide access to the engine compartment 70, a maintenance opening 72 is formed in the upper deck section 18. An engine compartment hatch 73 preferably closes the maintenance opening 72.

With reference to FIG. 1, the watercraft 10 includes a propulsion system 74. In the illustrated embodiment, the propulsion system 74 includes two propulsion units 76, 78. However, it is apparent to one of ordinary skill in the art that the watercraft 10 may include any number of propulsion units 76, 78.

Each propulsion unit 76, 78, includes an internal combustion engine 80, 82 and a corresponding propulsion device 84, 86. However, it is to be noted that the watercraft 10 may have a single internal combustion engine driving both of the propulsion devices 84, 86.

In the illustrated embodiment, the propulsion units 76, 78 are constructed substantially identically to each other, except for their arrangement with respect to the centerline 36 of the hull 14. Thus, the same reference numerals will be used to describe the various components of each propulsion unit 76, 78.

Figure 4:
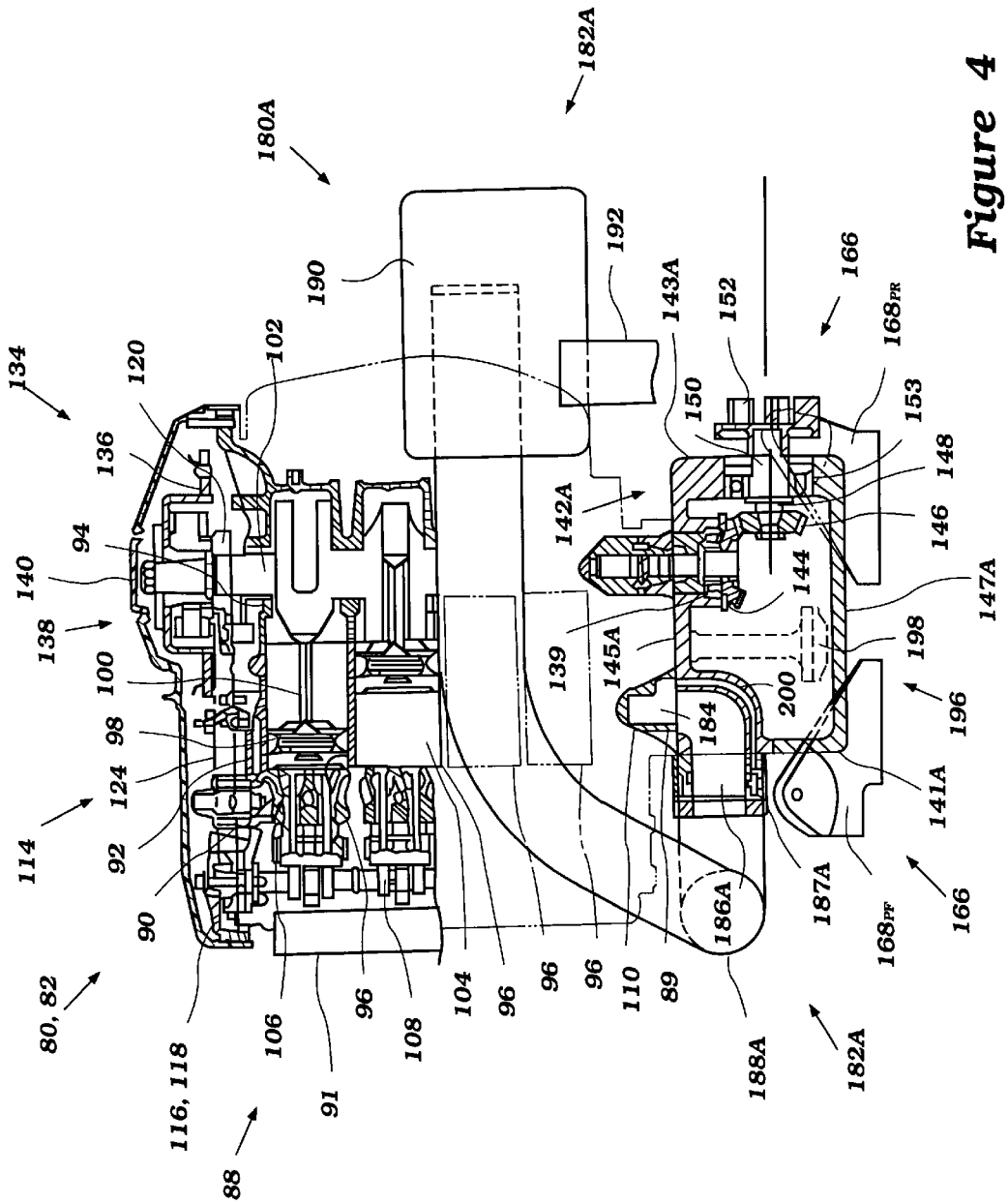
FIG. 4 is a side elevational and partial sectional view of an engine having a gear box assembly configured in accordance with a modification of the embodiment shown in FIG. 1.

As shown in FIG. 4, the engines 80, 82 are four-cylinder inline-type engines and operate under a four-stroke principle. However, it is to be understood that the engines 80, 82 may be of a V-type configuration, may have any number of cylinders, and may operate under different principles of operation (e.g., the two-stroke, rotary, and diesel principles).

The engines 80, 82 are formed of an engine body 88 having a cylinder head 90, a cylinder block 92, and a crankcase 94. The cylinder block 92 is formed with four horizontally-extending cylinder bores 96. The cylinder bores 96 may be formed from thin liners that are either cast or otherwise secured in place within the cylinder block 92. If a light alloy casting is employed for the cylinder block 92, such liners can be used.

In the illustrated embodiment, one piston 98 is provided within each cylinder bore 96. The pistons 98 are supported for reciprocation in the cylinder bores 96, respectively. Piston pins (not shown) connect the pistons 98 to respective connecting rods 100. The connecting rods 100 are journaled on throws of a crankshaft 102.

The crankshaft 102 is journaled at least partially within the engine body 88, by a plurality of bearings within the crankcase 94. In the illustrated embodiment, the engine body 88 is oriented such that the crankshaft 102 rotates about a crankshaft axis which is generally vertical when the watercraft 10 is at rest and floating in a body of water.

The cylinder head 90 is provided with individual recesses which cooperate with the respective cylinder bores 96 and the heads of the pistons 98 to form combustion chambers 104. These recesses are surrounded by a lower cylinder head surface that is planar and held in sealing engagement with the cylinder block 92, or with the cylinder head gaskets (not shown) interposed therebetween, in a known manner. This planar surface of the cylinder head 90 may partially override the cylinder bores 96 to provide a squish area, if desired. The cylinder head 90 may be affixed to the cylinder block 92 in any suitable manner.

Poppet-type exhaust valves 106 are slideably supported in the cylinder head 90 in a known manner, and have their head portions engageable with valve seats so as to control the flow of exhaust gases out of the combustion chambers 104 through exhaust passages (not shown) formed in the cylinder head 90. The exhaust valves 106 are biased towards their closed position by coil compression springs (not shown). The valves 106 are operated by an exhaust camshaft 108 which is journaled in the cylinder head 90. The exhaust camshaft 108 has lobes which operate the valves 106 through thimble tappets.

Although not illustrated, each of the exhaust passages extending from the exhaust valves 106 terminates in the face of the cylinder head 90 which mates with the cylinder block 92. The cylinder block 92 includes mating exhaust passages (not shown) which lead into a vertically extending exhaust collector passage 110 of the cylinder block 92. The exhaust collector passage 110 communicates at its lower end with an exhaust system, which will be described below in detail.

Figure 5:
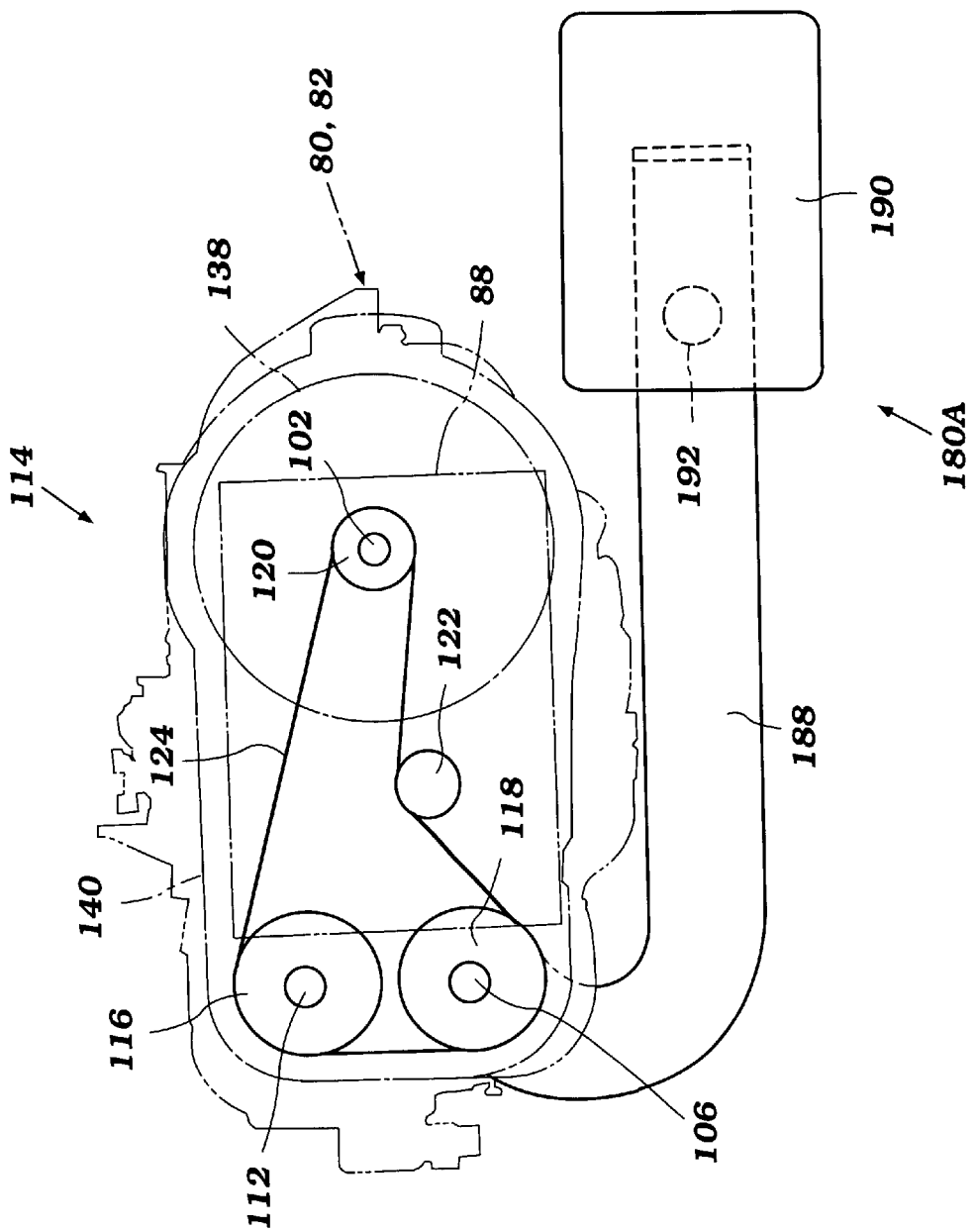
FIG. 5 is a top plan view of an engine included in the watercraft shown in 5 FIG. 1.

At least one intake valve (not shown) is supported for reciprocation in the cylinder head 90 for each combustion chamber 104, in a manner similar to the exhaust valves 106. The intake valves are biased towards their closed position by a coil compression springs (not shown). The intake valves are opened by an intake camshaft 112 (FIG. 5) which is journaled for rotation in the cylinder head 90. The intake camshaft 112 includes cam lobes that cooperate with thimble tappets for operating the intake valves in a known manner. As shown in FIG. 5, the respective rotational axes of the intake camshaft 112 and the exhaust camshaft 106 are parallel to each other. A camshaft cover 91 preferably covers the camshafts 106, 112.

With reference to FIG. 5, the intake camshaft 112 and the exhaust camshaft 106 are driven by a camshaft drive mechanism 114. The camshaft drive mechanism 114 includes an intake camshaft drive pulley 116 connected to an upper end of the intake camshaft 112, an exhaust camshaft drive pulley 118 attached to an upper end of the exhaust camshaft 106, a drive pulley 120 driven by an upper end of the crankshaft 102, and a tensioner pulley 122. Each of the pulleys 116, 118, and 120 are toothed. A toothed belt 124 engages each of the toothed pulleys 116, 118, and 120 so as to transmit a driving torque from the crankshaft 102 to each of the camshafts 112, 118. The tensioner pulley 122 is biased against the toothed belt 124 to maintain tension in the toothed belt 124.

With reference to FIGS. 1 and 3, the engines 80, 82 include each a fuel system for delivering fuel to the combustion chambers 104 of the engines 80, 82 in a manner known in the art. The fuel supply system includes a fuel tank 116 (FIG. 1), a fuel pump arrangement (not shown), and at least one charge former 126. The fuel pump arrangement is configured to draw fuel from the fuel tank 116 and deliver the fuel to the charger formers 126, in a known manner. The fuel pump arrangement may include one or a plurality of individual fuel pumps, depending on the particular configuration of the charge formers.

The charge formers 126 in the illustrated embodiment are in the form of carburetors. Each engine 80, 82 includes at least one carburetor 126 configured to deliver fuel charges to the combustion chambers 104. However, it is apparent to one of ordinary skill in the art that the fuel system can be constructed to include any number of carburetors, or to operate under a fuel injection principle including, for example, but without limitation, conventional induction passage fuel injection and direct fuel injection.

With reference to FIG. 1, the engines 80, 82 include an air induction system 128 configured to draw air from the engine compartment 70 into the engines 80, 82. In the illustrated embodiment, the air intake system 128 includes an air intake chamber 130 positioned next to the crankcase 94 of the respective engines 80, 82. The intake chamber 130 includes an inlet which allows air from the engine compartment 70 to pass into the intake chamber 130. An intake air duct 132 extends from the air intake chamber 130 to the carburetor 126. As noted above, the engines 80, 82 may include any number of carburetors 126. Preferably, the air intake system 128 includes a single or a plurality of intake ducts 132 which have one outlet for each carburetor 126.

In the illustrated embodiment, the air intake system 128 guides air from the engine compartment 70 into the carburetors 126. The carburetors 126 mix the air flowing through the air intake system 128 with the fuel supplied by the fuel system and delivers a fuel-air charge to the combustion chambers 104 formed within the engines 80, 82, respectively. Of course, as noted above other arrangements including direct or indirect fuel injection, could also be used with the air intake system 128. It is apparent to one of ordinary skill in the art that the air intake system 128 could be modified to operate with such a direct or indirect fuel injection system.

A suitable ignition system (not shown) is provided for igniting the fuel-air charges provided to each combustion chamber 104. Spark plugs (not shown) are preferably fired by the ignition system, which preferably includes an electronic control unit (ECU) (not shown) connected to the engines 80, 82 by one or more electrical cables. Preferably, the ECU is mounted within the engine compartment 70. A pulser-coil which generates firing signals for the spark plugs, may be incorporated into the electronic control unit. In addition, a battery may be provided for use in powering an electric starter motor and the like.

With reference to FIG. 4, a flywheel assembly 134 is provided at an upper end of the engine as viewed in FIG. 4. The flywheel assembly 134 includes a flywheel magneto 136 and a coil assembly 138 which cooperate to generate AC electric power. The AC power is led to the battery and/or to an electrical system (not shown). A timing belt cover 140 covers the flywheel assembly 134 and the camshaft drive mechanism 114.

With reference to FIG. 4, the gear box assembly 12 is provided at the lower end of the crankcase 102. In the illustrated embodiment, the gear box assembly 12 comprises a gear box 142A which is preferably formed of an aluminum alloy and is connected to the crankcase 94 and/or the cylinder block 92 by appropriate connection devices. However, it should be noted that the crankcase 142A may be formed from any material. Additionally, the gear box 142A may be formed partially monolithically with the engine body 88.

Figure 6:
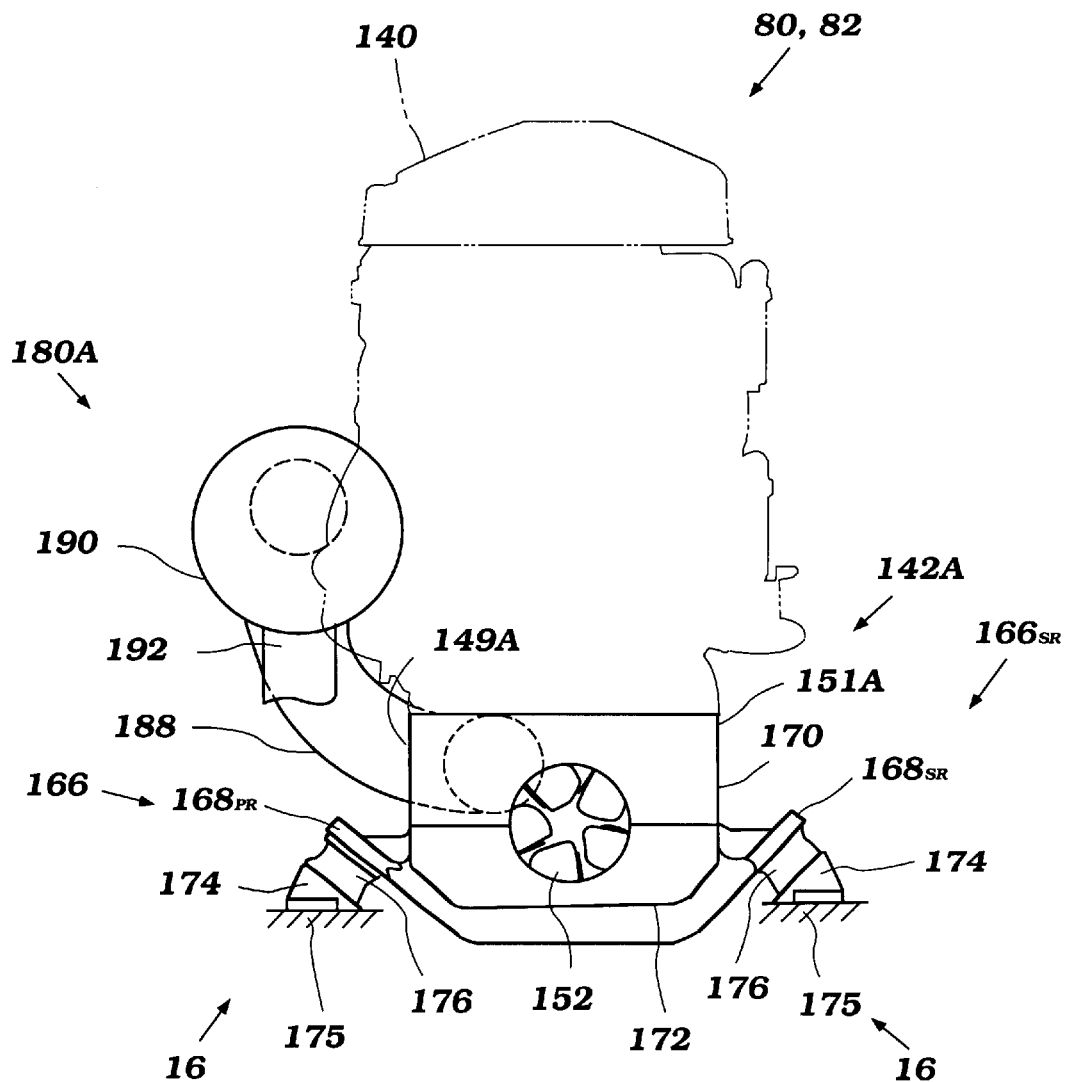
FIG. 6 is a rear elevational view of the engine shown in FIG. 4.

As shown in FIG. 4, the gear box 142A includes a front side wall 141A, a rear side wall 143A, a top wall 145A, and a bottom wall 147A. With reference to FIG. 6, the gear box 142A also includes a port side wall 149A and a starboard side wall 151 A.

As shown in FIG. 4, the crankshaft 102 extends through the top wall 145A and into the gear box 142A. The crankshaft 102 drives a bevel gear 144 which rotates about the vertically extending axis. Alternatively, the crankshaft may drive an intermediate input shaft through a spur gear transmission (not shown) where the input shaft also rotates about a vertical axis and extends through the top wall 145A and into the gear box 142A.

The spur gear 144 is journaled for rotation by an appropriate bearing 139 mounted in the top wall 145A and meshes with a second bevel gear 146 which rotates about a generally horizontal axis. Similarly, the second bevel gear 146 drives an output shaft which is journaled for rotation by an appropriate bearing 153 mounted in the rear wall 143A and the gear box 142A to rotate about a substantially horizontal axis 150. The output shaft 148 drives a first half 152 of a coupling device 154 (schematically represented in FIGS. 1 and 2). With reference to FIG. 2, the coupling device 154 connects the output shaft 148 with an impeller shaft 156.

With reference to FIGS. 1 and 2, the propulsion devices 84, 86 are constructed in a substantially identical manner, and thus, the same reference numerals are used to describe the various components of each propulsion device 84, 86. In the illustrated embodiment, the propulsion device 84 includes a jet pump unit 158 mounted within the tunnel 62 by a plurality of bolts (not shown). The intake duct formed by the tunnel 62 extends between the inlet 64 and the jet pump unit 158. Desirably, a gullet 160 is also formed by the hull tunnel 62 between the inlet 64 and the jet pump unit 158. A steering nozzle 162 is supported at the downstream end of a discharge nozzle 164 of the jet pump unit 158 by a pair of vertically extending pivot pins (not shown). In an exemplary embodiment, the steering nozzle 162 has an integral lever on one side that is coupled to the steering wheel 46 through, for example, a bowden-wire actuator, as known in the art. In this manner, the operator of the watercraft 10 can move the steering nozzle 162 to affect directional changes of the watercraft 10.

An impeller (not shown) is housed within the jet pump unit 158. The impeller is supported by the impeller shaft 156 which is journaled for rotation with a compression chamber of the jet pump unit 158. The impeller shaft 156 extends in a forward direction through a forward end of the hull tunnel 62. A protective casing preferably surrounds a portion of the impeller shaft 156 that lies forward of the tunnel 62.

As such, the engines 80, 82 power the respective propulsion devices 84, 86 to provide forward thrust to the watercraft 10. Preferably, a reverse bucket (not shown) is provided for diverting water discharged from the steering nozzle 162 so as to cause the reverse thrust for the watercraft 10.

With reference to FIG. 6, the engines 80, 82 are advantageously mounted to the lower hull portion 16 by a plurality of engine mounts which are directly connected to the gear box 142A. In the present embodiment, rear port engine mount $166_{PR}$, a front port engine mount $166_{PF}$, a starboard rear engine mount $166_{SR}$ and a starboard front engine mount $166_{SF}$ connect the gear box 142A with the lower portion 16.

As shown in FIG. 6, each of the engine mounts $166_{PR}$, $166_{PF}$, $166_{SR}$, $166_{SF}$ includes an upper bracket portion $168_{PR}$, $168_{PF}$, $168_{SR}$, $168_{SF}$, respectively, which is attached directly to the gear box 142A. In the illustrated embodiment, the gear box 142 is constructed of an inner member 170 and an outer member 172 which are connected together by any appropriate means, for example, but without limitation, bolts or welding. Alternatively, the upper brackets $168_{PR}$, $168_{PF}$, $168_{SR}$, $168_{SF}$ may be monolithically formed with the lower portion 172 of the gear box 142A.

As shown in FIG. 6, the engine mounts $166_{PR}$, $166_{PF}$, $166_{SR}$, $166_{SF}$ also include housing members 174 and shock absorbing portions 176 disposed between the upper brackets $168_{PR}$, $168_{PF}$, $168_{SR}$, $168_{SF}$ and the housing members 174. Preferably, the shock absorbing portions 176 are formed of rubber, however, the shock absorbing portions 176 may be formed of any appropriate material or device appropriate for use in mounting an internal combustion engine.

The housing portions 174 are attached to a mounting surface 175 of the lower hull portion 16 through any appropriate means, for example, but without limitation, bolts or adhesives. Alternatively, the housing portions 174 may be mounted to an intermediate member provided between the housing portion 174 and an inner surface of the lower hull portion 16.

By providing mounting the engines 80, 82, in the engine compartment 70 such that the crankshaft 102 of each extends vertically, length of the engines 80, 82, as measured along the longitudinal axis may be reduced. This reduction in overall length is particularly significant for in-line type engines. By reducing the overall length, in the longitudinal direction, a center of gravity of the engines 80, 82 may be shifted rearwardly, as compared to in-line engines which are horizontally oriented, i.e., oriented such that their crankshafts are horizontal. Thus, with the engine positioned closer to the transom of the watercraft, the overall length of the engine compartment 70 can be minimized. By minimizing the overall length of the engine compartment of a watercraft, the overall length of the watercraft can also be reduced, thereby reducing the overall dimensions and weight of the watercraft.

With reference to FIG. 4, the engines 80, 82 also include an exhaust system 180A for guiding exhaust gases from the combustion chambers 104 to the atmosphere. The engine exhaust system 180A includes the collector passage 110 and at least a first exhaust passage 182A for guiding exhaust gases from the collector passage 110 to the atmosphere.

As shown in FIG. 4, the collector passage 110 is formed at least partially within the engine body 88. In the illustrated embodiment, the collector passage 110 is defined in the cylinder block 92 and exits the cylinder block 92 at a lower end 89 of the engine body 88.

The collector passage 110 terminates in an exhaust outlet port 184. A first exhaust conduit 186A extends from the exhaust outlet port 184 to the exterior of the engine body 88. As shown in FIG. 4, a portion of the first exhaust conduit 186A is defined by the gear box 142A. Additionally, a water jacket 200A is formed around the first exhaust conduit 186A and is also defined by a portion of the gear box 142A.

By arranging the first exhaust conduit 186A through at least a portion of the gear box 142A, the noise associated with exhaust gases flowing therethrough is attenuated by the gear box 142A. The sound attenuation provided by the gear box 142F is particularly significant, as noted above, due to the thickness of the material forming the gear box 142F required by the reaction forces generated at the bearings journaling the bevel gears 144, 146. Additionally, the sound attenuation is further enhanced where the gear box 142A is also utilized as a lubricant reservoir for a lubrication system (described below) due to the sound attenuation effects that may be provided by a pool of liquid lubricant formed in the gear box 142A.

In the present embodiment, a second exhaust conduit 188A is connected to the first exhaust conduit 186A via an exhaust conduit coupling 187A, the construction of which is well known in the art. The second exhaust conduit 188A extends from the first exhaust conduit 186A and along the port side of the engine body 88. The second exhaust conduit 188A terminates in an expansion chamber 190A.

The expansion chamber 190A may be provided with internal baffles with sufficient volumes so as to provide silencing for the exhaust gases and also to preclude water from flowing to the engine body 88 through the exhaust system 180A. This type of construction is well known in the art and, for that reason, further description is not believed to be necessary.

A third exhaust conduit 192A extends downwardly from the expansion chamber 190A, then preferably extends over the hull tunnel 62 to an exhaust discharge 194. The discharge 194 is arranged on the starboard side of the hull tunnel 62 so as to discharge exhaust gases therefrom into the pump chamber 68, at an elevation above or below the waterline at which the watercraft 10 floats when at rest in a body of water.

As shown in FIG. 4, with the engine mounts $166_{PR}$, $166_{PF}$, $166_{SR}$, $166_{SF}$ attached to the gear box 142A, ample space is provided around the starboard and port sides of the engine body 88. In the illustrated embodiment, the second exhaust conduit 188A extends around the port side of the engine body 88, without interference from the engine mounts $166_{PR}$, $166_{PF}$, $166_{SR}$, $166_{SF}$. Additionally, the exhaust conduit 188A is compactly arranged around the engine body 88, thus allowing the size of the engine compartment 70 to be further reduced.

With reference to FIG. 4, the watercraft 10 also includes a lubrication system 196, referred to generally by the reference numeral 196. The lubrication system 196 includes a lubricant reservoir, which in the illustrated embodiment, is formed at least partially by the gear box 142A. In the illustrated embodiment, a lubricant filter 198 is provided in gear box 142A, which forms an influent port for a lubricant pump (not shown) which draws lubricant from the gear box 142A. The lubricant pump draws lubricant from the gear box 142, through the filter 198, and into the various lubricant galleries that can be provided within the engine body 88. For example, the engine body 88 may include lubricant galleries which direct lubricant from the lubricant pump to the crankshaft 102, the valves 106, the cylinder bores 96, the bearings which support the crankshaft 102, and the other various moving parts within the engine body 88. The engine body 88 also includes return galleries which allow lubricant, which has passed through the various components of the engine, to drain back to the gear box 142A. Once the lubricant has been returned to the gear box 142A, the lubricant may be recirculated through the lubrication system 196 by the lubricant pump.

By forming the lubricant reservoir with the gear box 142A, the gear box 142A according to the present invention allows the engines 80, 82 to be provided with a wet sump type lubrication system 196 without the need for providing an additional lubricant reservoir for collecting lubricant which is passed through the engine body 88. Thus, the gear box 142A provides the dual functions of journaling the bevel gears 144, 146 and collecting lubricant for the lubrication system 196, thereby efficiently using the limited space available in the engine compartments of watercraft.

The engines 80, 82 also preferably include a cooling system configured to circulate a coolant in thermal contact with at least a portion of the exhaust system 180A, to thereby cool at least a portion thereof. Preferably, a main coolant line (not shown) communicates with an interior of a high pressure area of the jet pump unit 158 (FIG. 1) to thereby bleed pressurized water from the jet pump unit 158. The main coolant line may be connected to various components within the watercraft 10, in order to distribute water thereto to be used as a coolant. Preferably, the main coolant line is connected to at least a main coolant jacket (not shown) formed in the engine body 88 with a known construction. For example, the coolant jacket of the engine body 88 preferably is in thermal contact with each of the cylinder bores 104 and the cylinder head 90.

The cooling system also preferably includes at least one cooling jacket in thermal communication with at least a portion of the exhaust system 180A. For example, as shown in FIG. 4, a coolant jacket 200A is configured to be in thermal communication with the first exhaust conduit 186A. In the illustrated embodiment, the coolant jacket 200A is defined, at least in part, by the gear box 142A. As such, the cooling jacket 200A may be in direct fluid communication with a coolant jacket formed in the engine body 88. For example, but without limitation, the coolant jacket 200A may communicate with a coolant jacket formed around the cylinder bores 96.

By providing a coolant jacket 200A around the first exhaust conduit 186A, which is at least partially defined by the gear box 142A, the gear box 142A according to the present invention, aids in preventing exhaust which passes through the first exhaust conduit 186A from heating lubricant which is collected in the gear box 142A.

With reference to FIGS. 1-3, a modification of the gear box assembly 12A and the exhaust system 180A illustrated in FIGS. 4-6 is shown therein. The gear box assembly 12B exhaust system 180B shown in FIG. 3 is substantially identical to the gear box assembly 12A and the exhaust system 180A illustrated in FIG. 4, and therefore, the various components of the gear box assembly 12B and the exhaust system 180B illustrated in FIG. 3 are labeled with the same reference numerals used for the exhaust system 180A, except that the "A" has been changed to a "B".

As shown in FIG. 3, the gear box assembly 12B exhaust system 180B differ from the gear box assembly 12A and the exhaust system 180A in that the first exhaust conduit 186B extends from the exhaust outlet port 184 to the port side wall 149B of the gear box 142B. As shown in FIGS. 1-3, each of the first exhaust conduits 186B of the exhaust system 180B extends from the crankcase 142A laterally, at a position between the engine mounts $166_{PR}$, $166_{PF}$.

The second exhaust conduit 188B extends upwardly into the expansion chamber 190B. The third exhaust conduit 192B extends horizontally from a rear side of the expansion chamber 190, and wraps over the hull tunnel 62 to the discharge 194.

Figure 7:
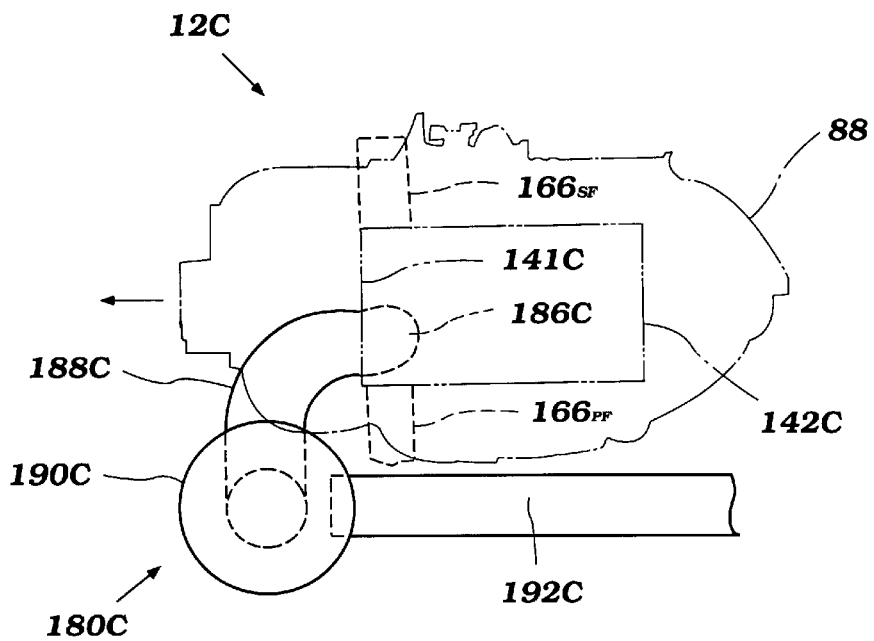
FIG. 7 is a top plan view of a engine having a gear box assembly configured in accordance with a modification of the embodiment shown in FIGS. 2-3.
Figure 8:
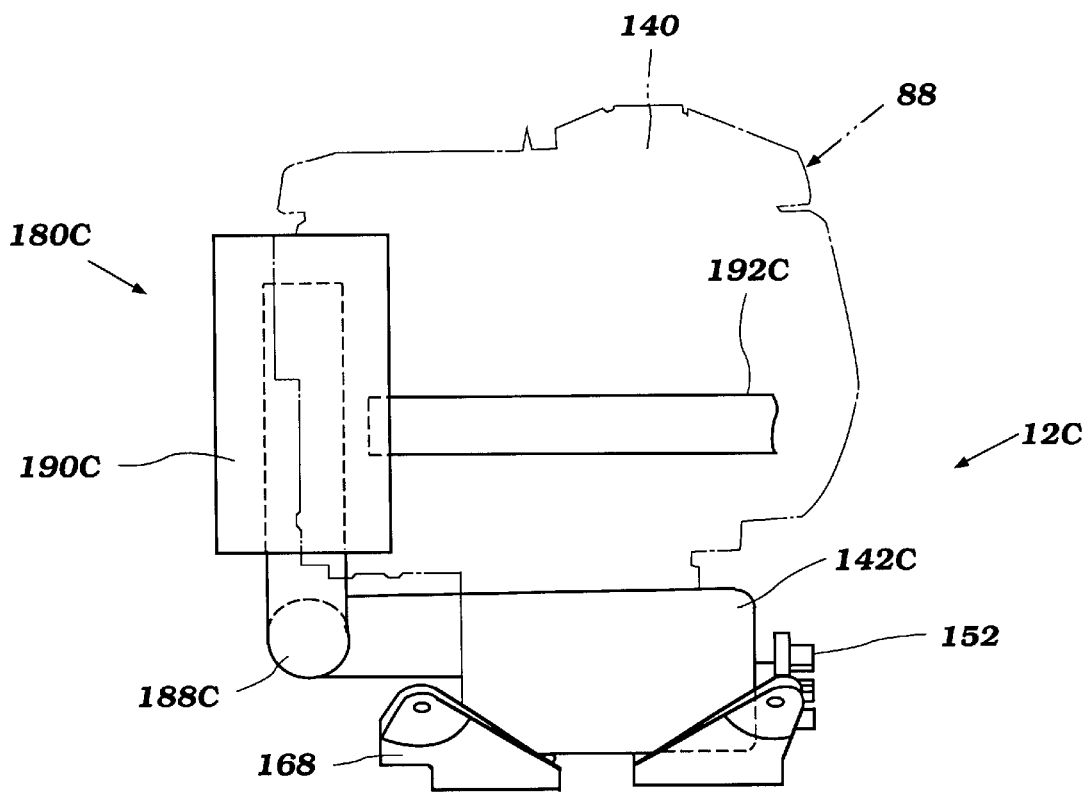
FIG. 8 is a side elevational view of the engine shown in FIG. 7.
Figure 9:
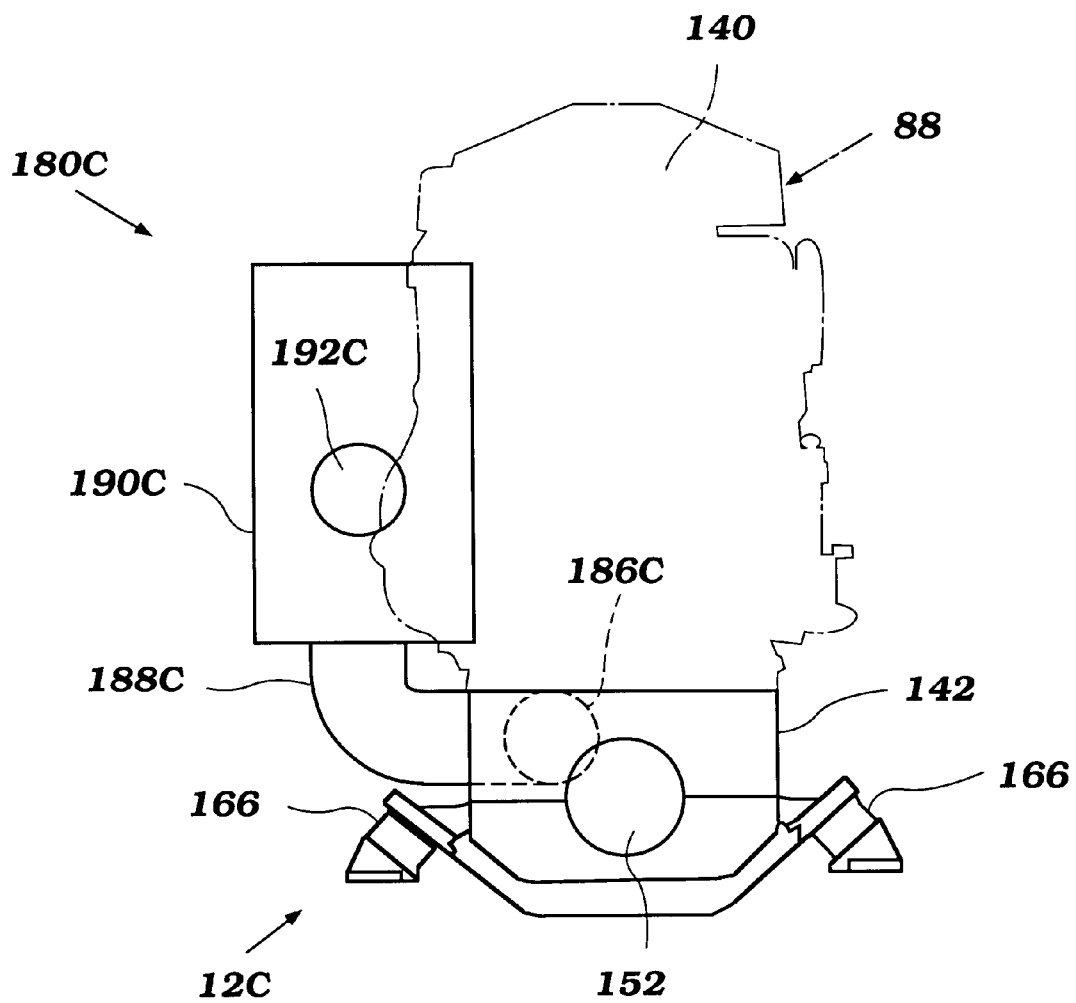
FIG. 9 is a rear elevational view of the engine shown in FIG. 7.

With reference to FIGS. 7-9, modification of the embodiments shown in FIGS. 4-6 is illustrated therein. The gear box assembly 12C and the exhaust system 180C shown in FIGS. 7-9, include substantially identical components to those illustrated in the embodiments of FIGS. 1-3, and thus, the same reference numerals will be used except that the "B" has been changed to a "C". As shown in FIGS. 7-9, the exhaust system 180C includes a first exhaust conduit 186C which extends forwardly to the front wall 141C of the gear box 142C. As illustrated in FIG. 9, first exhaust conduit 186C terminates at the forward wall 141C at a position between the engine mounts $166_{PF}$, $166_{SF}$.

As shown in FIGS. 7 and 8, the second exhaust conduit 188C connects the first exhaust conduit 186C to the expansion chamber 190C. As shown in FIG. 7, as viewed in top plan view, the second exhaust conduit 188C turns toward the port side of the engine 80, 82, as shown in FIG. 8, and upwardly into the expansion chamber 190C.

The expansion chamber 190C extends generally vertically next to a forward end of the engine 80, 82. The third exhaust conduit 192C extends approximately horizontally from the expansion chamber 190C at an elevation above the gear box 142C. Although not illustrated, the exhaust conduit 192C extends rearwardly from the engine 80, 82 and to an exhaust discharge (not shown). Optionally, the exhaust conduit 192C may be connected to various other exhaust system components (not shown) which are configured for further sound attenuation and/or water preclusion.

Figure 10:
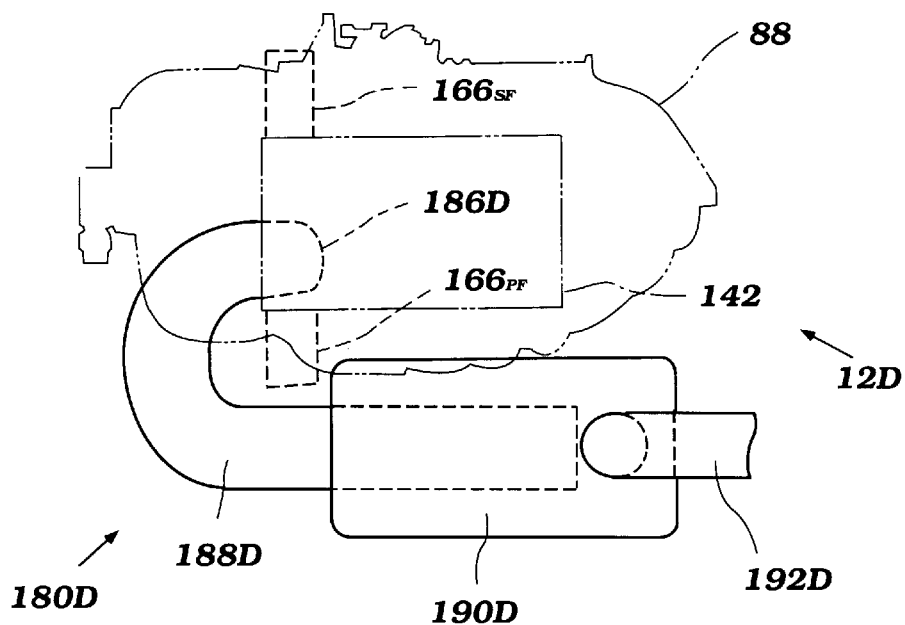
FIG. 10 is a top plan view of an engine having a gear box assembly configured in accordance with a further modification of the embodiment shown in FIGS. 2-3.
Figure 11:
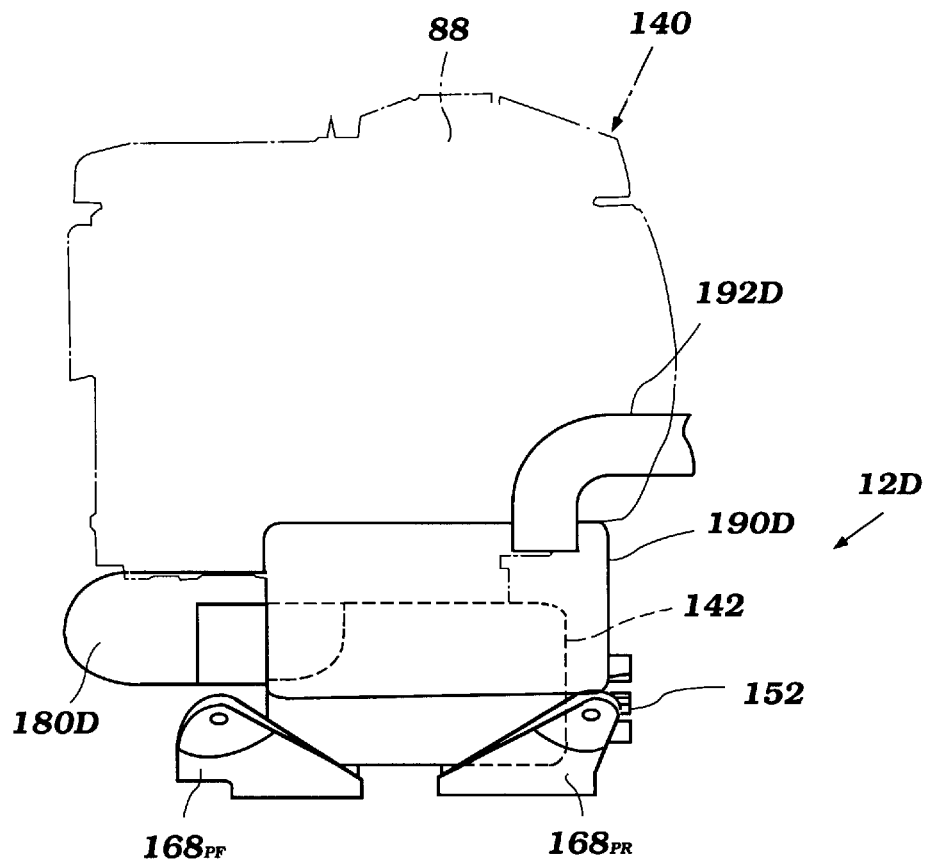
FIG. 11 is a side elevational view of the engine shown in FIG. 10.
Figure 12:
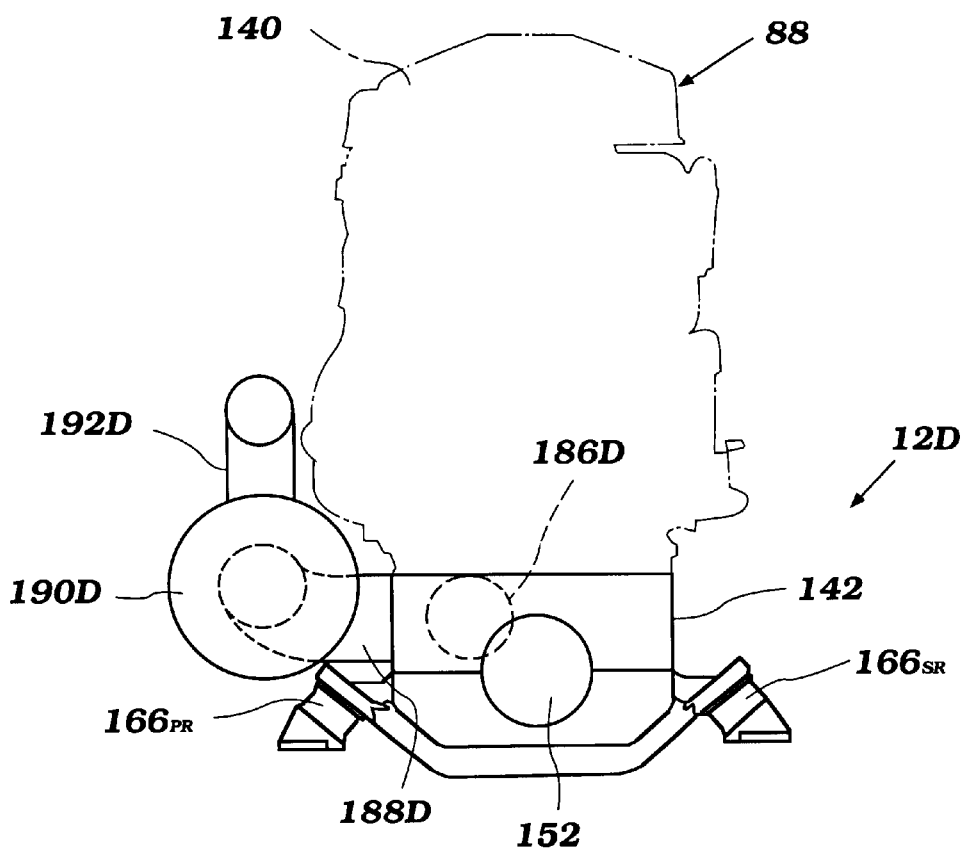
FIG. 12 is a rear elevational view of the engine shown in FIG. 10.

With reference to FIGS. 10-12, a further modification of the gear box assembly 12A and the exhaust system 180A of FIGS. 4-6 is illustrated therein. The exhaust system 180D shown in FIGS. 10-12 include components which are substantially identical to the gear box assembly 12A and the exhaust system 180A, except as noted below. Thus, the same reference numerals have been used to identify the various components of the exhaust system 180D, except that the "A" has been changed to a "D".

As shown in FIG. 10, the exhaust system 180D includes a first exhaust conduit 186D which extends forwardly to the front wall 141 D of the gear box 142D. As shown in FIG. 12, the first exhaust conduit 186D extends forwardly from the gear box 142D and connects to the second exhaust conduit 188D at a position between the engine mounts $166_{PF}$, $166_{SF}$. With reference again to FIG. 10, the second exhaust conduit 188D turns approximately 180° to connect the first exhaust conduit 186D with the expansion chamber 190D.

With reference to FIG. 11, the expansion chamber 190D extends generally horizontally and is positioned generally between the engine brackets $168_{PF}$, $168_{PR}$. With the expansion chamber 190D arranged as such, the expansion chamber is tightly arranged in the vicinity of the engine body 88, thus efficiently using the limited space available in the engine compartment 70.

With reference to FIG. 10, the outer periphery of the engine body 88 is illustrated in phantom. The expansion chamber 190D is positioned so as to lie at least partially beneath the engine body 88. Additionally, as shown in FIG. 11, the expansion chamber 190D is arranged approximately at the elevation of the interface between the cylinder block 92 and the gear box 142D.

With reference to FIG. 11, the third exhaust conduit 192D extends upwardly from the expansion chamber 190D. Although not illustrated, the third exhaust conduit 192D is preferably routed rearward from the engine body 88, over the hull tunnel 62 and to the discharge 194 mounted on the transom of the watercraft 10. Additionally, the third exhaust conduit 192D may be connected to other various exhaust system components, as described above with resect to the third exhaust conduit 192C.

Figure 13:
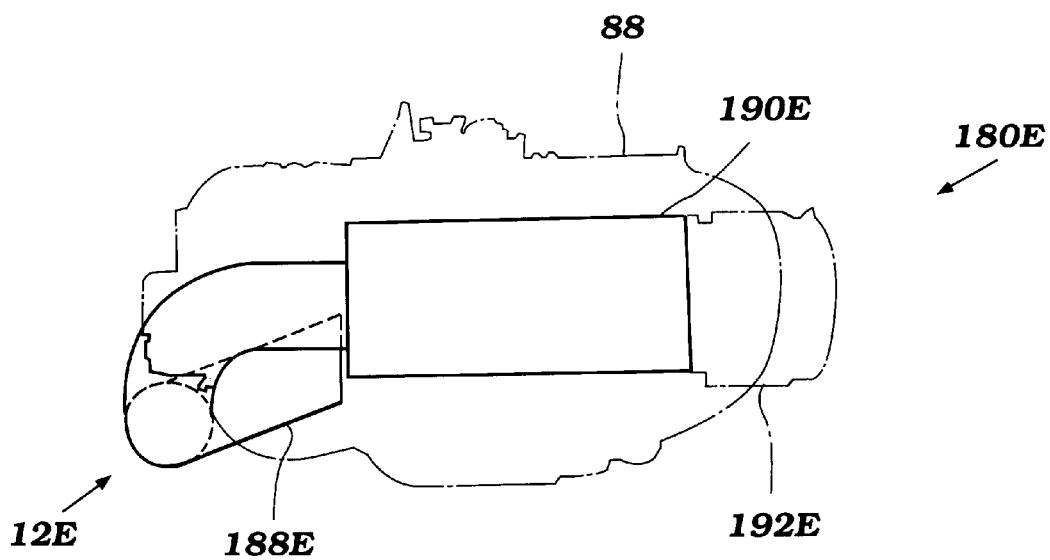
FIG. 13 is a top plan view of an engine having a gear box assembly configured in accordance with another modification of the embodiment shown in FIGS. 2-3.

With reference to FIGS. 13-15, a further modification of the gear box assembly 12A and exhaust system 180A of FIGS. 4-6 is illustrated therein. The exhaust system 180E illustrated in FIGS. 13-15 includes components that are substantially identical to the components of the gear box assembly 12A and the exhaust system 180A. Thus, the components of the exhaust system 180E are identified with the same reference numerals except that the "A" has been changed to an "E".

As shown in FIGS. 14 and 15, the first exhaust conduit 186E extends forwardly to the front wall 141E of the gear box 142E. As shown in FIG. 14, the first exhaust conduit 186E terminates at the front wall 141E at a position between the engine mounts $166_{PF}$, $166_{SF}$. The second exhaust conduit 188E extends forwardly from the first exhaust conduit 186E, around a front end of the engine body 88, and upwards to an elevation above the engine body 88. As shown in FIG. 15, the second exhaust conduit 188E connects the first exhaust conduit 186E with the expansion chamber 190E.

As shown in FIG. 13, the expansion chamber 190E is positioned directly above the engine body 88. The third exhaust conduit 192E extends rearwardly from the expansion chamber 190E. Preferably, although not illustrated, the third exhaust passage 192E extends to the discharge formed on the transom of the watercraft 10.

As shown in FIG. 15, the exhaust system 180E may include a cooling jacket 200E. As described above with reference to the cooling jacket 200A shown in FIG. 4, the cooling jacket 200E may extend around the second exhaust conduit 188E and the first exhaust conduit 186E and be in fluid communication with a main water jacket formed within the engine body 88. Additionally, the third exhaust conduit 192E may include a portion which allows the water jacket 200E to mix with exhaust gases flowing through the exhaust system 180E. By positioning such a portion rearward from the expansion chamber 190E, it is less likely that water discharged from the cooling jacket 200E may flow back through the exhaust conduit 188E toward the engine, due to the elevation of the expansion chamber 190E.

By configuring the first exhaust conduit 186E to extend to the front wall 141E of the gear box 142E and by arranging the second exhaust conduit 188E to extend around a forward end of the engine body 88, as illustrated in FIGS. 13 and 14, the exhaust system 180E can be arranged so as not to affect the overall width of the engine body 88. Thus when two engines, such as engines 80, 82 are each provided with the exhaust system 180E, the exhaust system 180E does not require additional spacing between the engines 80, 82.

Figure 16:
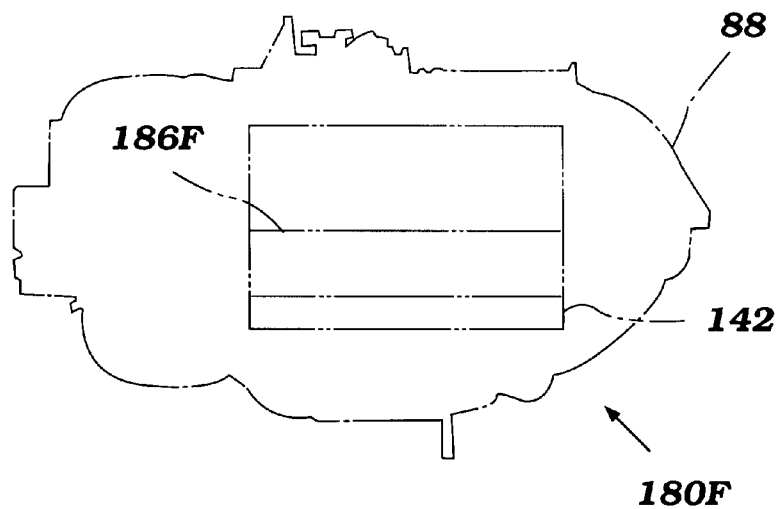
FIG. 16 is a top plan view of an engine having a gear box assembly configured in accordance with further modification of the embodiment shown in FIGS. 2-3.
Figure 17:
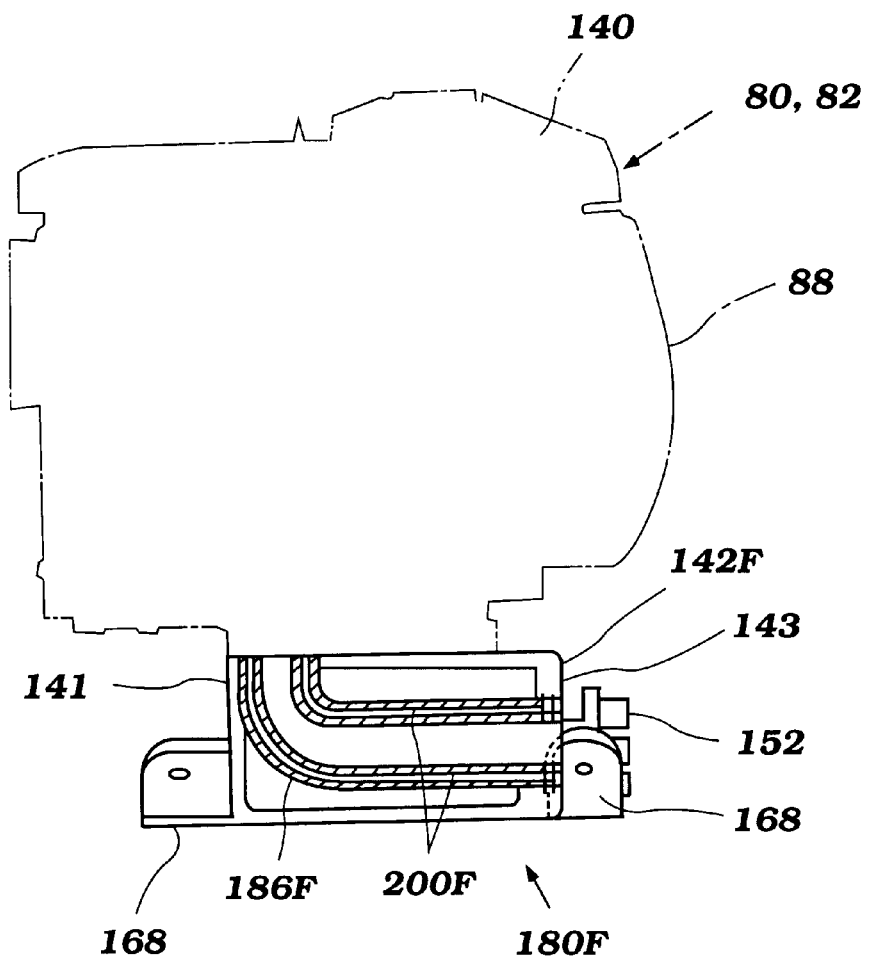
FIG. 17 is a side elevational view of the engine shown in FIG. 16.
Figure 18:
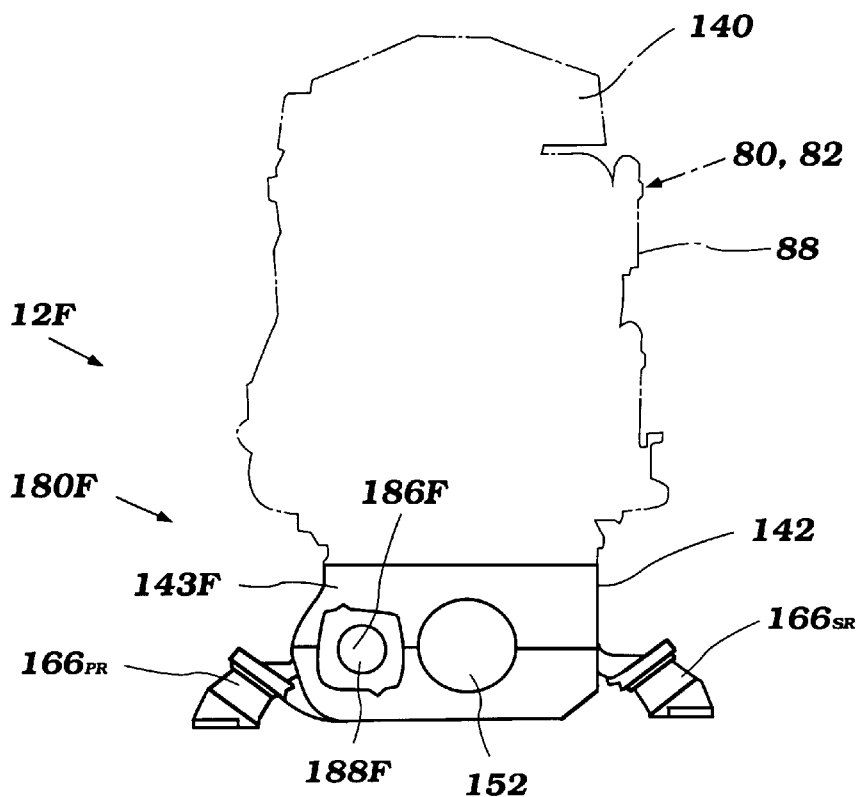
FIG. 18 is a rear elevational view of the engine shown in FIG. 16.

With reference to FIGS. 16-18, a further modification of the gear box assembly 180A and the exhaust system 180A of FIGS. 4-6 is illustrated therein. The gear box assembly 12F and the exhaust system 180F of FIGS. 16-18 include components which are substantially identical to the components of the gear box assembly 180A and the exhaust system 180A except as noted below. Thus, the exhaust system 180F uses the same reference numerals as the gear box assembly 180A and the exhaust system 180A, except that the "A" has been changed to an "F".

As shown in FIGS. 16 and 17, the first exhaust conduit 186F extends downwardly from the engine body 88 proximate to the front wall 141F of the gear box 142F, then curves rearwardly to the rear face 143F of the gear box 142F. Additionally, the coolant jacket 200F extends around and in thermal communication with the exhaust conduit 186F. As shown in FIG. 18, the first exhaust conduit 186F connects to the second exhaust conduit 188F at the rear face 143F of the gear box 142F.

Downstream from the first exhaust conduit 186F, in the direction of the flow of exhaust gases therethrough, the second exhaust conduit 188F may be connected to various other exhaust system components as described above with respect to the exhaust system 180C.

By configuring the first exhaust conduit 186F to extend from a position proximate to the front wall 141F to the rear wall 143F of the gear box 142F, the gear box 142F illustrated in FIG. 18 provides additional sound attenuation of the exhaust flowing through the first exhaust conduit 186F. The sound attenuation provided by the gear box 142F is particularly significant, as noted above, due to the thickness of the material forming the gear box 142F. Additionally, the sound attenuation provided is further enhanced where the gear box 142F is also utilized as a lubricant reservoir for a lubrication system due to the sound attenuation effects that may be provided by a pool of liquid lubricant formed in the gear box 142F.

Figure 19:
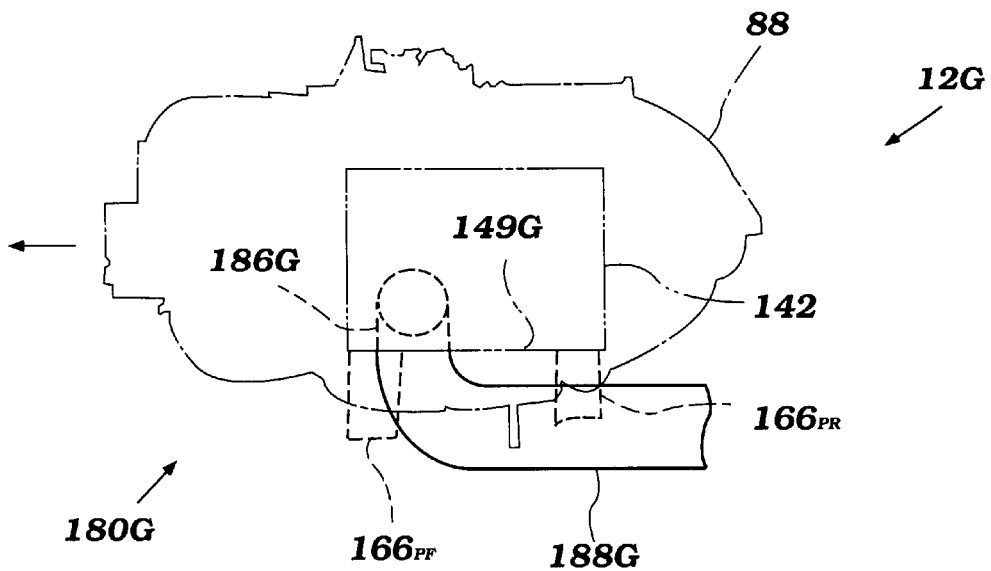
FIG. 19 is a top plan view of an engine having a gear box assembly configured in accordance with yet another modification of the embodiment shown in FIGS. 2-3.
Figure 20:
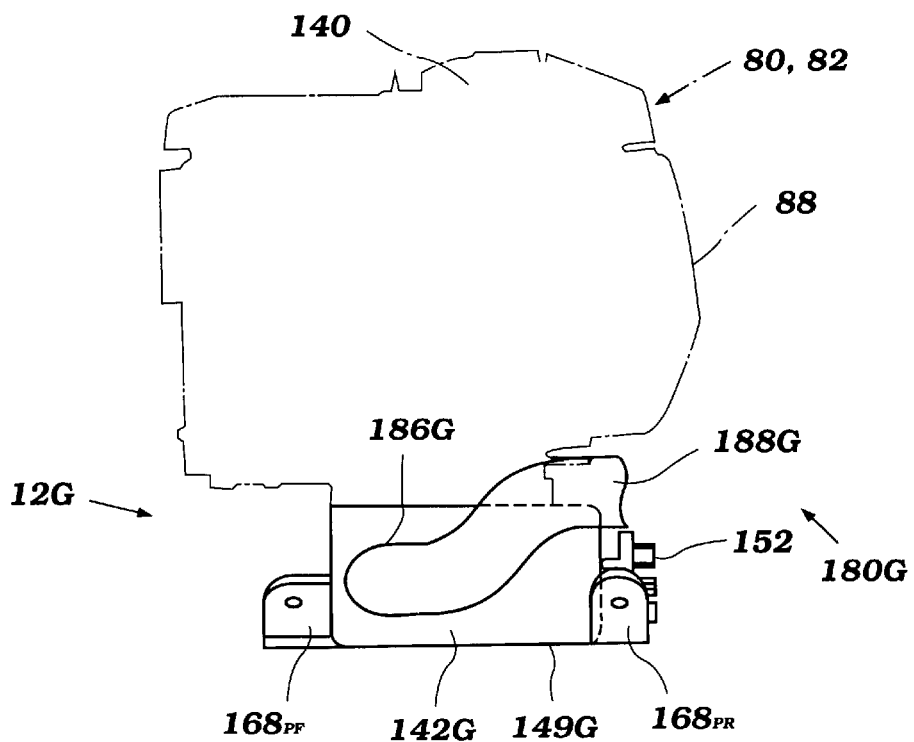
FIG. 20 is a side elevational view of the embodiment shown in FIG. 19.
Figure 21:
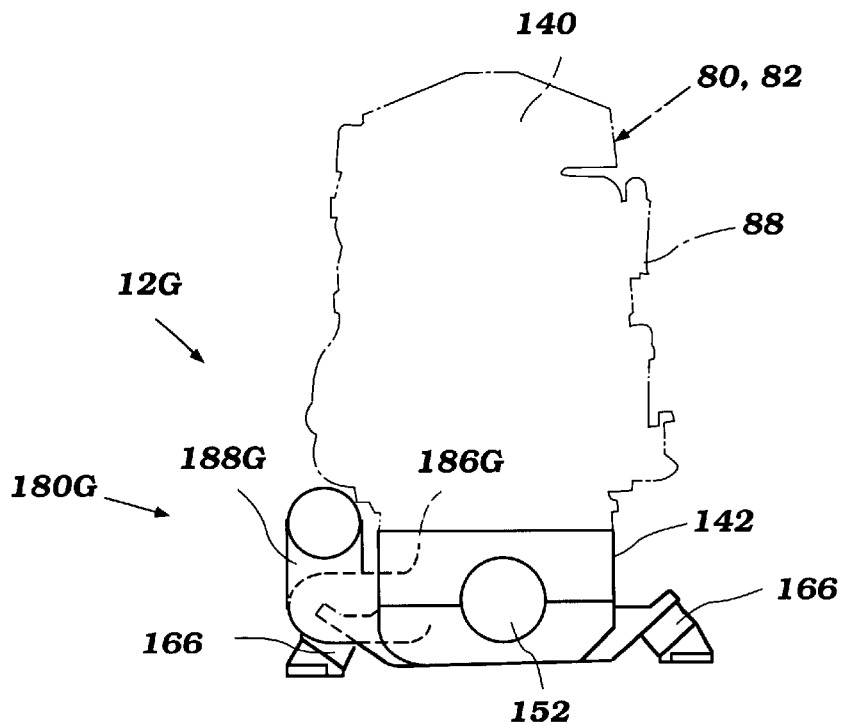
FIG. 21 is a rear elevational view of the embodiment shown in FIG. 19.

With reference to FIGS. 19-21, a further modification of the gear box assembly 180A and the exhaust system 180A illustrated in FIGS. 4-6 is illustrated therein. The gear box assembly 180G and the exhaust system 180G illustrated in FIGS. 19-21 include components which are substantially identical, except as noted below, to the the gear box assembly 180A and the exhaust system 180A. Thus, the components of the the gear box assembly 180G and the exhaust system 180G are identified with the same reference numerals, except that the "A" has been changed to a "G".

As illustrated in FIGS. 19 and 20, the first exhaust conduit 186G of the exhaust system 180G extends to the port side wall 149G of the gear box 142G between the brackets 168$_{PR}$, 168$_{PF}$. In the illustrated embodiment, the second exhaust conduit 188G turns rearwardly from the first exhaust conduit 186G then upwardly over the rear bracket 168. The second exhaust conduit 188G similarly to the second exhaust conduit 188C, may be connected to various other exhaust system components.

As shown in FIGS. 19 and 21, by arranging the second exhaust conduit 188G as such, at least a portion of the second exhaust conduit 188G extends below at least a portion of the engine body 88, thus, aiding in minimizing the overall width of the engine 80, 82.

As shown in each of the modifications of FIGS. 1-21, by extending at least a portion of the exhaust system 180A, 180B, 180C, 180D, 180E, 180F, 180G, through the gear box 142A, 142B, 142C, 142D, 142E, 142F, 142G, there is significant flexibility in arranging the downstream components of the respective exhaust system. Additionally, such downstream exhaust system components may be arranged tightly around the engine body 88, thus efficiently using the limited space available in engine compartments of small watercraft, such as the engine compartment 70.

By providing a gear box at a lower end of an engine having a vertically extending crankshaft and by providing the gear box with engine mounts, the engine may be readily mounted to the engine compartment of a small watercraft, such as the watercraft 10, without the need for providing engine mounting surfaces which extend well above the gear box. Thus, other engine components, such as the exhaust system, may be routed adjacent to and around the gear box. Alternatively, the exhaust system may be routed away from the gear box, thus allowing other components of the engine to be mounted adjacent the gear box.

Additionally, by mounting the gear box below an engine having a vertically extending crankshaft in the engine compartment of a watercraft having a passengers' area positioned forward of the engine compartment, the resulting orientation of the engine allows the overall length of the engine compartment to be minimized, thus allowing the overall length of the watercraft, and the weight associated therewith, to be minimized. By minimizing the overall weight of the watercraft, the power-to-weight ratio is maximized. Additionally, by mounting the engine vertically above the gear box, the center of gravity of the engine may be arranged as close as possible to the rear of the watercraft, thus enhancing the weight distribution of the watercraft 10 and the watercraft's ability to ride up on plane.

Of course, the foregoing description is that of certain features, aspects, and advantages of the present invention to which various changes and modifications may be made without departing from the spirit and scope of the present invention. Moreover, a watercraft, marine engine, or gear box for a marine engine may not feature all objects and advantages discussed above to use certain features, aspects and advantages of the present invention. Thus, for example, those skilled in the art will recognize that the invention may be embodied or carried out in a manner that achieves or optimizes one advantage or group of advantages as taught herein without necessarily achieving other objects or advantages as may be taught or suggested herein. The present invention, therefore, should only be defined by the appended claims.

What is claimed is:

1. A watercraft comprising a hull having a passengers' area, an engine compartment positioned rearward from the passengers' area, at least one propulsion device supported by the hull, at least one engine disposed within the engine compartment and configured to drive the propulsion device, the engine having an engine body and a crankshaft journaled for rotation at least partially within the engine body, and a plurality of engine mounts mounting the engine in the engine compartment such that the crankshaft rotates about a generally vertical axis.

2. The watercraft according to claim 1 additionally comprising at least two seats positioned in the passengers' area and being arranged in a side-by-side fashion.

3. The watercraft according to claim 1, wherein at least a portion of the gear box is formed monolithically with a portion of the engine body.

4. The watercraft according to claim 1 additionally comprising a plurality of engine mount housings fixed to the mounting surface, a plurality of vibration absorbing members being disposed between the engine mounts connected to the gearbox and the engine mount housings.

5. The watercraft according to claim 1 additionally comprising a lubrication system having a lubricant reservoir and being configured to circulate lubricant through at least one lubricant gallery within the engine body, the lubricant reservoir being formed at least partially by the gearbox.

6. The watercraft according to claim 1 additionally comprising a cooling system having at first cooling jacket in thermal communication with the portion of the exhaust conduit extending through the gearbox, configured to cool the portion of the exhaust conduit.

7. The watercraft according to claim 6 additionally comprising the second cooling jacket defined in the engine body, the first cooling jacket fluidically communicating with the second cooling jacket.

8. The watercraft according to claim 1 additionally comprising an exhaust collector passage defined in the engine body and having an exhaust outlet port, the exhaust conduit extending from the exhaust outlet port.

9. The watercraft according to claim 8, wherein the exhaust conduit extends downwardly from the exhaust outlet port and extends to a side wall of the gearbox.

10. The watercraft according to claim 9, wherein the exhaust conduit extends to a side wall of the gearbox which faces toward a side of the engine body at a position between two of the engine mounts.

11. The watercraft according to claim 10, wherein the exhaust system further comprises an exhaust treatment device communicating with the exhaust conduit.

12. The watercraft according to claim 11, wherein the exhaust treatment device is positioned at least partially below the engine body.

13. The watercraft according to claim 11, wherein the exhaust treatment device is positioned next to the engine and at an elevation above the gearbox.

14. The watercraft according to claim 11, wherein the exhaust treatment device is positioned directly above the engine body.

15. The watercraft according to claim 9, wherein the exhaust conduit extends to a side wall the gearbox which faces toward a front side of the engine body at a position between two of the engine mounts.

16. The watercraft according to claim 15, wherein the exhaust system additionally comprises an exhaust treatment device communicating with the exhaust conduit.

17. The watercraft according to claim 15, wherein the exhaust treatment device is positioned at least partially below the portion of the engine body.

18. The watercraft according to claim 15, wherein the exhaust treatment device is positioned between two of the engine mounts.

19. The watercraft according to claim 9, wherein the exhaust conduit extends to a side wall the gearbox which faces toward a rear side of the engine body at a position between two of the engine mounts.

20. The watercraft according to claim 9, wherein the exhaust outlet port is positioned proximate to a front end of the gearbox.

21. The watercraft according to claim 20 additionally comprising a lubrication system having a lubricant reservoir and being configured to circulate lubricant through at least one lubricant gallery within the engine body, the lubricant reservoir being formed at least partially by the gearbox.

22. The watercraft according to claim 1 additionally comprising another engine having an engine body and a crankshaft journaled at least partially within the engine body, the engine being mounted within the engine compartment such that the crankshaft rotates about a generally vertical axis.

23. A watercraft comprising a hull having a passengers' area, an engine compartment positioned rearward from the passengers' area, at least one propulsion device supported by the hull, at least one engine disposed within the engine compartment and configured to drive the propulsion device, the engine having an engine body and a crankshaft journaled for rotation at least partially within the engine body about a generally vertical axis, a gear box having an output shaft extending generally transverse to the generally vertical axis and rearward from the gearbox, the output shaft being driven by the crankshaft of the engine, the engine body being arranged above the gear box, and a plurality of engine mounts connecting the gear box with a mounting surface within the engine compartment, and an exhaust conduit extending at least partially through the gearbox.

24. The watercraft according to claim 23 additionally comprising at least two seats positioned in the passengers' area and being arranged in a side-by-side fashion.

25. The watercraft according to claim 23, wherein at least a portion of the gear box is formed monolithically with a portion of the engine body.

26. The watercraft according to claim 23 additionally comprising a lubrication system having a lubricant reservoir and being configured to circulate lubricant through at least one lubricant gallery within the engine body, the lubricant reservoir being formed at least partially by the gearbox.

27. The watercraft according to claim 23 additionally comprising a cooling system having at first cooling jacket in thermal communication with the portion of the exhaust conduit extending through the gearbox, configured to cool the portion of the exhaust conduit.

28. The watercraft according to claim 27 additionally comprising the second cooling jacket defined in the engine body, the first cooling jacket fluidically communicating with the second cooling jacket.

29. The watercraft according to claim 23 additionally comprising an exhaust collector passage defined in the engine body and having an exhaust outlet port, the exhaust conduit extending from the exhaust outlet port.

30. The watercraft according to claim 29, wherein the exhaust conduit extends downwardly from the exhaust outlet port and extends to a side wall of the gearbox.

31. The watercraft according to claim 30, wherein the exhaust conduit extends to a side wall of the gearbox which faces toward a side of the engine body at a position between two of the engine mounts.

32. The watercraft according to claim 30, wherein the exhaust conduit extends to a side wall the gearbox which faces toward a front side of the engine body at a position between two of the engine mounts.

33. The watercraft according to claim 30, wherein the exhaust conduit extends to a side wall the gearbox which faces toward a rear side of the engine body at a position between two of the engine mounts.

34. The watercraft according to claim 29 wherein the exhaust outlet port is positioned proximate to a front end of the gearbox.

35. The watercraft according to claim 23 additionally comprising a lubrication system having a lubricant reservoir and being configured to circulate lubricant through at least one lubricant gallery within the engine body, the lubricant reservoir being formed at least partially by the gearbox.

36. The watercraft according to claim 23 additionally comprising a second engine having a second engine body and a crankshaft journaled at least partially within the second engine body, a second gear box having a second output shaft extending generally transverse to the generally vertical axis and rearward from the second gearbox, the second output shaft being driven by the crankshaft of the second engine, the second engine body being arranged above the second gear box, and a plurality of engine mounts connecting the second gear box with the mounting surface within the engine compartment.

37. A watercraft comprising a hull having a passengers' area, an engine compartment, at least one propulsion device supported by the hull, at least one engine disposed within the engine compartment and configured to drive the propulsion device, the engine having an engine body and a crankshaft journaled for rotation at least partially within the engine body about a generally vertical axis, a gear box having an output shaft extending generally transverse to the generally vertical axis and rearward from the gearbox, the output shaft being driven by the crankshaft of the engine, the engine body being arranged above the gear box, and a lubrication system having a reservoir and being configured to circulate lubricant between the reservoir and at least one lubricant gallery formed within the engine body, the gearbox forming at least part of the lubricant reservoir.

38. The watercraft according to claim 37 additionally comprising an influent port of the lubrication system being positioned within the gear box.

39. The watercraft according to claim 37 additionally comprising at least two seats positioned in the passengers' area and being arranged in a side-by-side fashion.

40. The watercraft according to claim 37, wherein at least a portion of the gear box is formed monolithically with a portion of the engine body.

41. The watercraft according to claim 37 additionally comprising a plurality of engine mounts connecting the gearbox with a mounting surface within the engine compartment.

42. The watercraft according to claim 37 additionally comprising a at least a first exhaust conduit, at least a portion of which extends at least partially through the gearbox.

43. The watercraft according to claim 37 additionally comprising a cooling system having at first cooling jacket in thermal communication with the portion of the exhaust conduit extending through the gearbox, configured to cool the portion of the exhaust conduit.

44. The watercraft according to claim 40 additionally comprising a second engine having a second engine body and a crankshaft journaled at least partially within the second engine body, the second engine being mounted within the engine compartment such that the crankshaft rotates about a generally vertical axis, a second gear box having a second output shaft extending generally transverse to the generally vertical axis and rearward from the second gearbox, the second output shaft being driven by the crankshaft of the second engine, the second engine body being arranged above the second gear box, and a second lubrication system having a second reservoir and being configured to circulate lubricant between the second reservoir and at least one lubricant gallery formed within the second engine body, the second gearbox forming at least part of the lubricant reservoir.

45. A watercraft comprising a hull having a passengers' area, an engine compartment positioned rearward from the passengers' area, at least one propulsion device supported by the hull, at least one engine configured to drive the propulsion device, the engine having an engine body and a crankshaft journaled for rotation at least partially within the engine body about a generally vertical axis, a gear box having an output shaft extending generally transverse to the generally vertical axis and rearward from the gearbox, the output shaft being driven by the crankshaft of the engine, the engine body being arranged above the gear box, and an exhaust system configured to guide exhaust gases from the engine body to the atmosphere, the exhaust system comprising at least a first exhaust conduit, at least a portion of the first exhaust conduit extending at least partially through the gearbox.

46. The watercraft according to claim 45, wherein at least a portion of the gear box is formed monolithically with a portion of the engine body.

47. The watercraft according to claim 45 additionally comprising a plurality engine mounts connecting the to gearbox with a mounting surface within the engine compartment.

48. The watercraft according to claim 45 additionally comprising a lubrication system having a lubricant reservoir and being configured to circulate lubricant through at least one lubricant gallery within the engine body, the lubricant reservoir being formed at least partially by the gearbox.

49. The watercraft according to claim 45 additionally comprising a cooling system having at first cooling jacket in thermal communication with the portion of the exhaust conduit extending through the gearbox, configured to cool the portion of the exhaust conduit.

50. The watercraft according to claim 45 additionally comprising a second engine having a second engine body and a crankshaft journaled at least partially within the second engine body, the second engine being mounted within the engine compartment such that the crankshaft rotates about a generally vertical axis, a second gear box having a second output shaft extending generally transverse to the generally vertical axis and rearward from the second gearbox, the second output shaft being driven by the crankshaft of the second engine, the second engine body being arranged above the second gear box, and a second exhaust system configured to guide exhaust gases from the second engine body to the atmosphere, the second exhaust system comprising at least a one exhaust conduit, at least a portion of the one exhaust conduit extending at least partially through the second gearbox.

51. A watercraft comprising a hull having a passengers' area, an engine compartment positioned rearward from the passengers' area, at least one propulsion device supported by the hull, at least one engine configured to drive the propulsion device, the engine having an engine body and a crankshaft journaled for rotation at least partially within the engine body about a generally vertical axis, a gear box having an output shaft extending generally transverse to the generally vertical axis and extending rearward from the gearbox, the output shaft being driven by the crankshaft of the engine, the engine body being arranged above the gear box, and means for guiding exhaust through at least a portion of the gearbox.

52. The watercraft according to claim 51 additionally comprising at least two seats arranged in the passengers' area in a side-by-side fashion.

53. The watercraft according to claim 51 additionally comprising means for guiding coolant through at least a portion of the gearbox.

54. The watercraft according to claim 51 additionally comprising means for mounting the gearbox to a mounting surface within the engine compartment.

55. The watercraft according to claim 51 additionally comprising a second engine having a second engine body and a crankshaft journaled at least partially within the second engine body, the second engine being mounted within the engine compartment such that the crankshaft rotates about a generally vertical axis, a second gear box having an output shaft extending generally transverse to the generally vertical axis and extending rearward from the second gearbox, the output shaft being driven by the crankshaft of the second engine, the second engine body being arranged above the second gear box, and means for guiding exhaust through at least a portion of the second gearbox.

* * * * *